(12) United States Patent
Foreman et al.

(10) Patent No.: US 11,890,763 B2
(45) Date of Patent: Feb. 6, 2024

(54) THREADED ROD SHEARING MECHANISM

(71) Applicant: Ridge Tool Company, Elyria, OH (US)

(72) Inventors: Evan Thomas Foreman, Wellington, OH (US); Richard M. Kundracik, Cleveland, OH (US)

(73) Assignee: Ridge Tool Company, Elyria, OH (US)

( * ) Notice: Subject to any disclaimer, the term of this patent is extended or adjusted under 35 U.S.C. 154(b) by 182 days.

(21) Appl. No.: 17/212,066

(22) Filed: Mar. 25, 2021

(65) Prior Publication Data

US 2021/0299895 A1    Sep. 30, 2021

Related U.S. Application Data

(60) Provisional application No. 63/000,165, filed on Mar. 26, 2020.

(51) Int. Cl.
*B26B 15/00* (2006.01)
(52) U.S. Cl.
CPC .................................. *B26B 15/00* (2013.01)

(58) Field of Classification Search
CPC ................................. B26B 15/00; B23D 17/00
USPC ......... 30/228, 194, 226, 227, 225, 197, 198, 30/223, 219, 220
See application file for complete search history.

(56) References Cited

U.S. PATENT DOCUMENTS

| 7,487,654 | B2 * | 2/2009 | Lefavour | B25B 27/10 72/21.6 |
|---|---|---|---|---|
| 2004/0181947 | A1 * | 9/2004 | Wagner | B23D 17/02 30/228 |
| 2019/0151965 | A1 * | 5/2019 | Fenske | B23D 35/002 |
| 2020/0086326 | A1 * | 3/2020 | Johnson | E02F 3/965 |

* cited by examiner

*Primary Examiner* — Phong H Nguyen
(74) *Attorney, Agent, or Firm* — Mark Bandy; Rankin Hill & Clark, LLP

(57) ABSTRACT

Shear tools are described. In one version, the shear tools include a pair of pivotally movable jaws positioned between sideplates. Various shearing dies are also described. Also described are systems and related methods utilizing the shear tools and dies which enable convenient shearing or severing of workpieces such as threaded rods.

20 Claims, 21 Drawing Sheets

THREADED ROD SHEARING MECHANISM

CROSS REFERENCES TO RELATED APPLICATIONS

This application claims priority upon U.S. provisional application Ser. No. 63/000,165 filed Mar. 26, 2020.

FIELD

The present subject matter relates to shearing or severing threaded rods and similar workpieces using power tools and a tool head. In particular, the present subject matter relates to dies used for such shearing. The present subject matter also relates to methods of shearing metal rods and similar workpieces using the tool heads and dies.

BACKGROUND

Contractors use strut channel for the installation of electrical, plumbing, and HVAC components. Strut channel provides a means for mounting these components. Strut channel hardware is universal and readily available for attaching these components to the strut channel. (See, e.g., U.S. Pat. No. 10,451,198 to Lupsa et al.) In most applications strut channel is suspended from a ceiling or other structure using two equal length pieces of threaded rod. Typically, the threaded rod is mild steel or, in particular applications, stainless steel. The industry standard way of cutting the rod to length is by use of reciprocating saws and band saws, whether portable or not.

Recently, a few shearing machines have appeared in the market and have been used for shearing or severing threaded rods. The advantages of shearing rather than cutting are increased speed, burr-free ends of sheared or severed elongated metal bars, threaded rods and similar workpieces, and avoidance of sparks or metal chips which typically result from cutting metal rods and similar workpieces when using the saws noted above. In addition, shearing blades or shearing tools typically exhibit relatively long lifetimes and do not need frequent replacement. In contrast, saw blades used in cutting devices wear out quickly.

Although satisfactory in many regards, a number of disadvantages exist with currently known shear tools. Rod shearing tools are generally dedicated to a specific location for a shearing application. (See, e.g., U.S. Pat. No. 10,293,416 to Huang et al.) Thus, typical rod shearing tools are limited to severing rods at specific locations and can not be used for other non-shearing operations at remote jobsites such as for example making press connections on plumbing lines. This limitation results in additional equipment being required and tool and other equipment costs to the user. Accordingly, a need exists for a shearing system that is powered by a tool that many users may already have in their possession and/or which they may use for non-shearing operations.

Also, current high tonnage equipment options for shearing rods are often heavy and not easily moved around a job site. Accordingly, a need exists for a high tonnage shearing system that is portable.

Moreover, corded tool options for shearing rods typically require the use of a generator in a new construction application where power outlets are often not available. Accordingly, a need exists for a system in which shearing can be performed using battery power.

Although some of the known shearing devices address some of the noted problems, none of these devices address all or most of the problems. Accordingly, a need exists for a new shearing tool system that provides an improved combination of overall reduction-in-time when using a shearing mechanism.

To address the needs noted above, a shearing tool system incorporating the shearing mechanism of the present subject matter provides a user with a system able to achieve overall reduction-in-time to begin and complete a job, increased compatibility with many if not most of the commercially-available power tools many users already own, ease and convenience in effort, lower cost, and greater tool access.

SUMMARY

The difficulties and drawbacks associated with previous approaches are addressed in the present subject matter as follows.

In one aspect, the present subject matter provides at least two dies adapted for use with a tool head having a pair of pivotally-connected jaws. The at least two dies comprise a first die having a front projection, a medial projection, and a rearwardly located stop member. The first die defines a first capture region between the front projection and the medial projection, and a second capture region between the medial projection and the stop member. The dies include a second die also having a front projection, a medial projection, and includes a rear projection. The second die similarly defines a first capture region between the front projection and the medial projection, and a second capture region between the medial projection and the rear projection.

In another aspect, the present subject matter provides a tool head and dies for shearing or severing a workpiece such as an elongated metal bar or threaded rod. The tool head and dies include a pair of pivotally attached jaws. The pair of jaws include a first jaw defining a first die recess, and a second jaw defining a second die recess. The tool head and dies also include a first die disposed in the first die recess. The first die has a front projection, a medial projection, and a rearwardly located stop member. The first die defines a first capture region between the front projection and the medial projection, and a second capture region between the medial projection and the stop member. The tool head and dies also include a second die disposed in the second die recess. The second die has a front projection, a medial projection, and a rear projection. The second die defines a first capture region between the front projection and the medial projection, and a second capture region between the medial projection and the rear projection.

In yet another aspect, the present subject matter provides a tool system comprising a power assembly including a body, a handle, and a motor. The tool system also comprises a tool head including a pair of pivotally attached jaws. The pair of jaws has a first jaw defining a first die recess, and a second jaw defining a second die recess. The tool system also comprises a first die disposed in the first die recess. The first die has a front projection, a medial projection, and a rearwardly located stop member. The first die defines a first capture region between the front projection and the medial projection, and a second capture region between the medial projection and the stop member. The tool system also comprises a second die disposed in the second die recess. The second die has a front projection, a medial projection, and a rear projection. The second die defines a first capture region between the front projection and the medial projection, and a second capture region between the medial projection and the rear projection.

In still another aspect, the present subject matter provides a method of severing a workpiece. The method comprises providing a tool system including a power assembly, and a tool head including a pair of pivotally attached jaws. The pair of jaws have a first jaw defining a first die recess, and a second jaw defining a second die recess. The tool system also includes a first die, and a second die. The first die is disposed in the first die recess. The first die has a front projection, a medial projection, and a rearwardly located stop member. The first die defines a first capture region between the front projection and the medial projection, and a second capture region between the medial projection and the stop member. The second die is disposed in the second die recess. The second die has a front projection, a medial projection, and a rear projection. The second die defines a first capture region between the front projection and the medial projection, and a second capture region between the medial projection and the rear projection. The method also comprises positioning a workpiece in the tool head and between the dies. The method further comprises actuating the power tool such that the jaws are pivotally displaced and cause movement of one die past the other die to thereby shear the workpiece.

In yet another aspect, the present subject matter provides at least two dies adapted for use with a tool head having a pair of jaws. The at least two dies comprise a first die having a front projection, a medial projection, and a rearwardly located stop member. The first die defines a first capture region between the front projection and the medial projection, and a second capture region between the medial projection and the stop member. The at least two dies also comprise a second die having a front projection, a medial projection, and a rearwardly located stop member. The second die defines a first capture region between the front projection and the medial projection, and a second capture region between the medial projection and the stop member.

In still another aspect, the present subject matter provides at least two dies adapted for use with a tool head having a pair of jaws. The at least two dies comprise a first die having a front projection and a rearwardly located stop member. The first die defines a first region between the front projection and the stop member. The at least two dies also comprise a second die having a front projection and a rearwardly located stop member. The second die defines a second region between the front projection and the stop member. The first region of the first die is non-identical to the second region of the second die.

In yet another aspect, the present subject matter provides a method of severing two rods to equal length. The method comprises providing a tool system including a power assembly and a tool head including a pair of pivotally attached jaws. The pair of jaws have a first jaw defining a first die recess, and a second jaw defining a second die recess. The tool head also includes a first die, and a second die, wherein the first die is disposed in the first die recess. The first die has a front projection, a medial projection, and a rearwardly located stop member. The first die defines a first capture region between the front projection and the medial projection, and a second capture region between the medial projection and the stop member. The second die is disposed in the second die recess. The second die has a front projection, a medial projection, and a rear projection. The second die defines a first capture region between the front projection and the medial projection, and a second capture region between the medial projection and the rear projection. The method also comprises positioning a first rod in the tool head and between the dies. The method also comprises positioning a second rod in the tool head and between the dies. The method additionally comprises actuating the tool such that the jaws are pivotally displaced and cause movement of one die past the other die to thereby shear the first rod and the second rod.

In still another aspect, the present subject matter provides in combination with a pair of elongated rods, a tool head system for severing the rods. The tool head system comprises a power assembly and a tool head. The tool head includes a pair of pivotally attached jaws. The pair of jaws include a first jaw defining a first die recess, and a second jaw defining a second die recess. The tool head also includes a first die disposed in the first die recess. The first die has a front projection, a medial projection, and a rearwardly located stop member. The first die defines a first capture region between the front projection and the medial projection, and a second capture region between the medial projection and the stop member. The tool head also includes a second die disposed in the second die recess. The second die has a front projection, a medial projection, and a rear projection. The second die defines a first capture region between the front projection and the medial projection, and a second capture region between the medial projection and the rear projection. One of the pair of elongated rods is disposed in one of the first and second capture regions and the other of the pair of elongated rods is disposed in the other of the first and second capture regions. The power assembly is operatively connected to the tool head, and the tool head is operatively connected to the jaws. The power assembly is powered for severing the pair of elongated rods to equal length.

As will be realized, the subject matter described herein is capable of other and different embodiments and its several details are capable of modifications in various respects, all without departing from the claimed subject matter. Accordingly, the drawings and description are to be regarded as illustrative and not restrictive.

DETAILED DESCRIPTION OF THE EMBODIMENTS

As previously noted, currently available cutting devices typically exhibit one or more of the following problems. Affordable and common methods of cutting threaded rod using saws are messy and time consuming. Most if not all methods for cutting threaded rods using saws require deburring the cut. Deburring requires additional time and effort by a user, which is undesirable. Another disadvantage with common methods of cutting is that saw blades wear out quickly. The present subject matter provides shearing tools and shearing methods for shearing rod faster, cleaner, and without leaving sharp edges and thus avoiding the need to deburr the cut face.

Currently known sets of shearing dies are limited in that they can only be used with one piece of threaded rod at a time. The present subject matter enables a user to shear two pieces of threaded rod at the same time.

In addition, known devices for cutting multiple rods at a single time, while advertised as portable, are actually relatively large bulky machines which are not easily carried. (See, e.g., U.S. Pat. No. 10,092,966 to Parks et al. and assigned to Black & Decker Inc.) The present subject matter provides a relatively small and portable system for shearing pairs of threaded rods.

Moreover, and in accordance with the present subject matter, when positioning a rod to be sheared in the tool head, careful alignment or positioning of the rod relative to the tool head and/or dies is not necessary. Instead, a user merely positions the rod against a stop member on the die(s) prior to shearing the rod. With currently known devices, the rod must be carefully aligned and positioned into the shearing grooves of the dies. Thus, mechanisms and systems incorporating the present subject matter improve ease of use and enable a user to increase speed for shearing threaded rod.

Also, current shearing products in the market use removable fasteners such as threaded bolts and screws to retain dies securely, or to permit change of dies, whenever desired. (See, e.g., U.S. Pat. No. 10,092,966 to Parks et al. and assigned to Black & Decker.) When removing a screw, the user is unfortunately left with loose parts to keep track of. In sharp contrast, certain embodiments of the present subject matter utilize a quick release clamp or cam screw to hold the dies in place so that they may be more easily detachable from the tool head that is disclosed herein.

Figure 1:
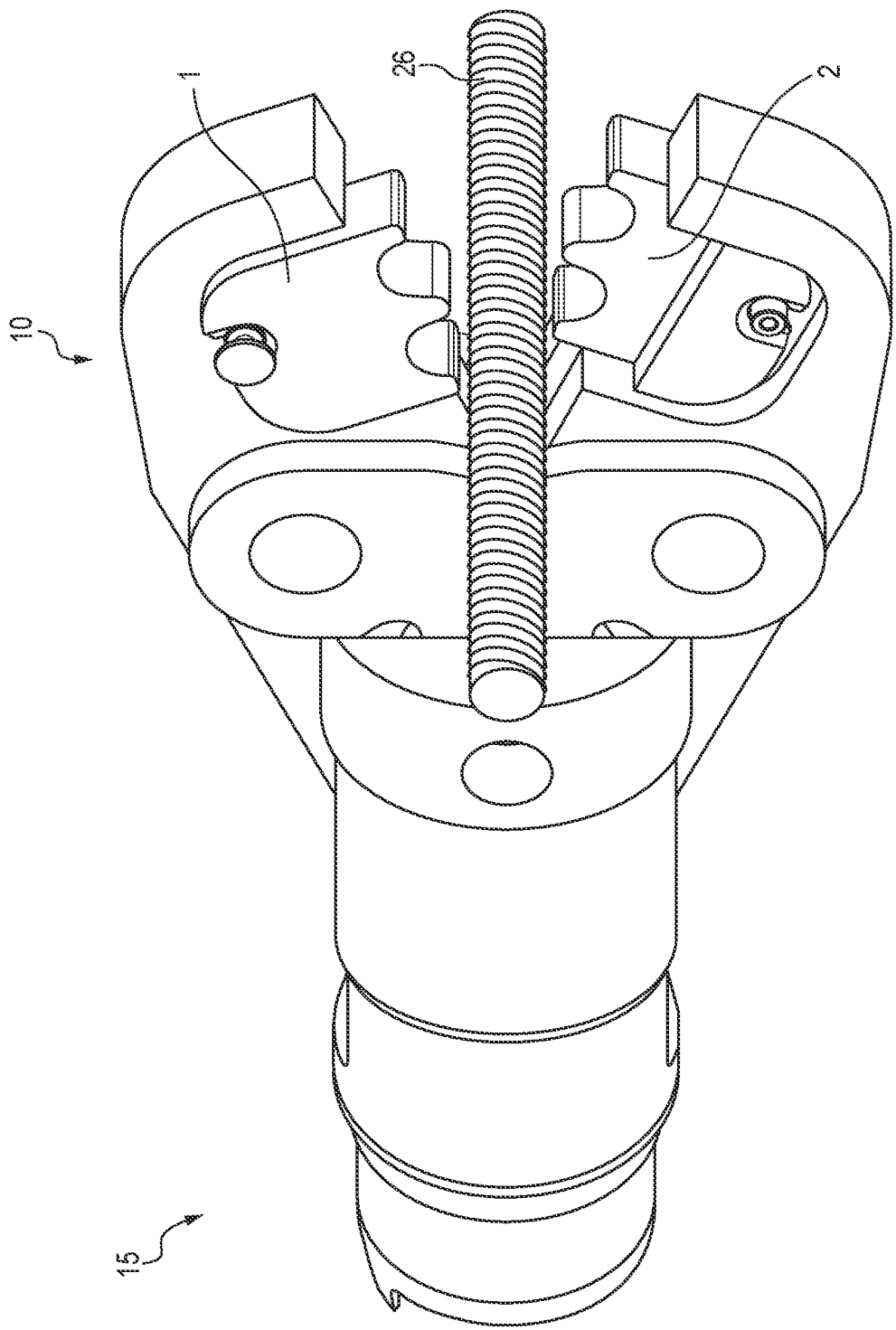
FIG. 1 is a schematic front perspective view of a shearing tool head attached to a power tool with the tool head using a pair of conventional dies known in the prior art for severing a rod.

FIG. 1 is a perspective view of a prior art threaded rod shearing assembly of a tool head 10 attached to a front portion of a power tool 15. In prior art threaded rod shearing mechanisms, upper and lower dies 1, 2 are identical or similarly shaped. The figure reveals that the upper and lower dies 1, 2 are primarily located on opposites sides of a shearing plane extending generally through a threaded rod 26 positioned between the dies.

Figure 2:
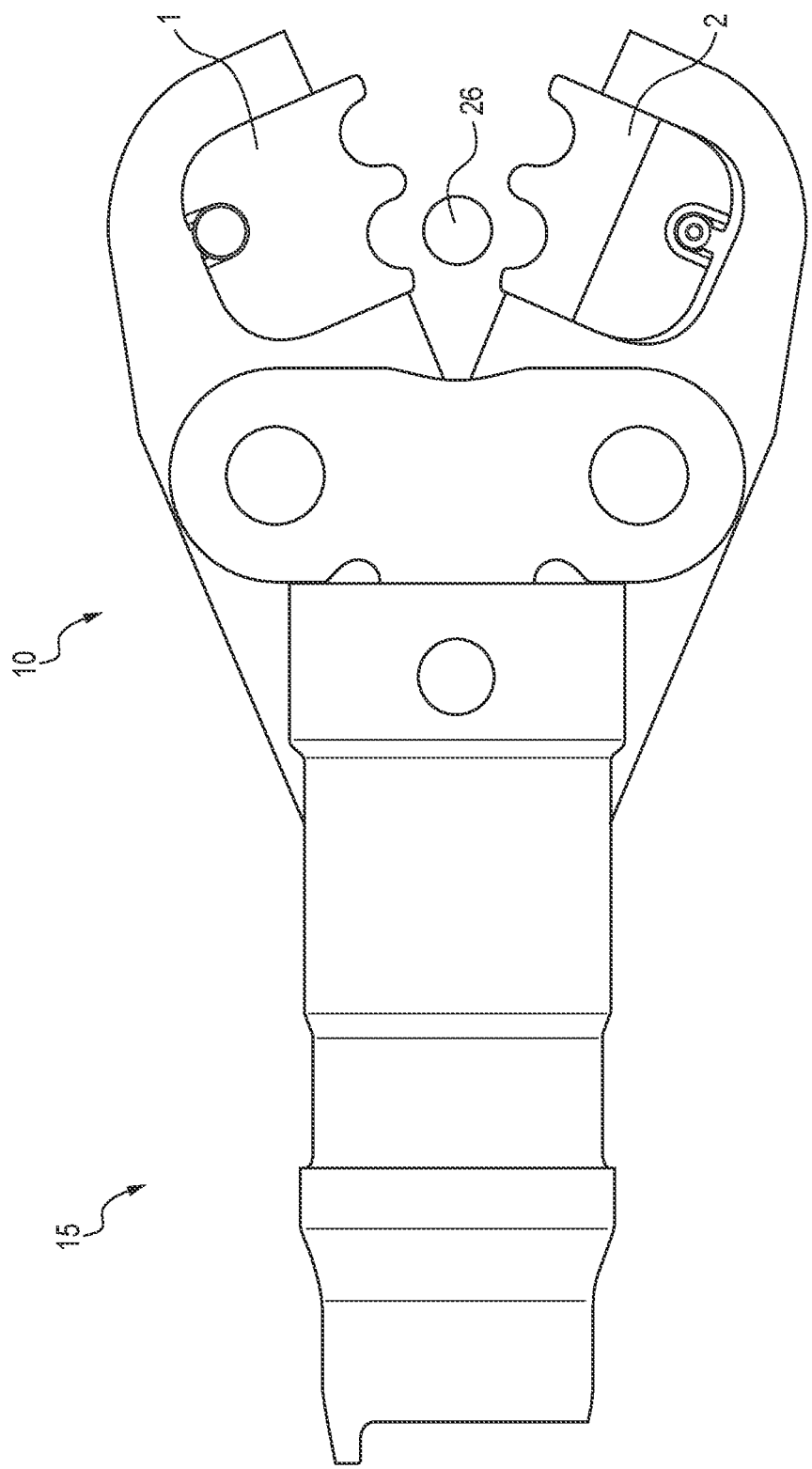
FIG. 2 is a schematic side elevational view of the shearing tool head and a portion of the power tool of FIG. 1 illustrating positioning and alignment of the rod relative to the dies prior to severing.
Figure 3:
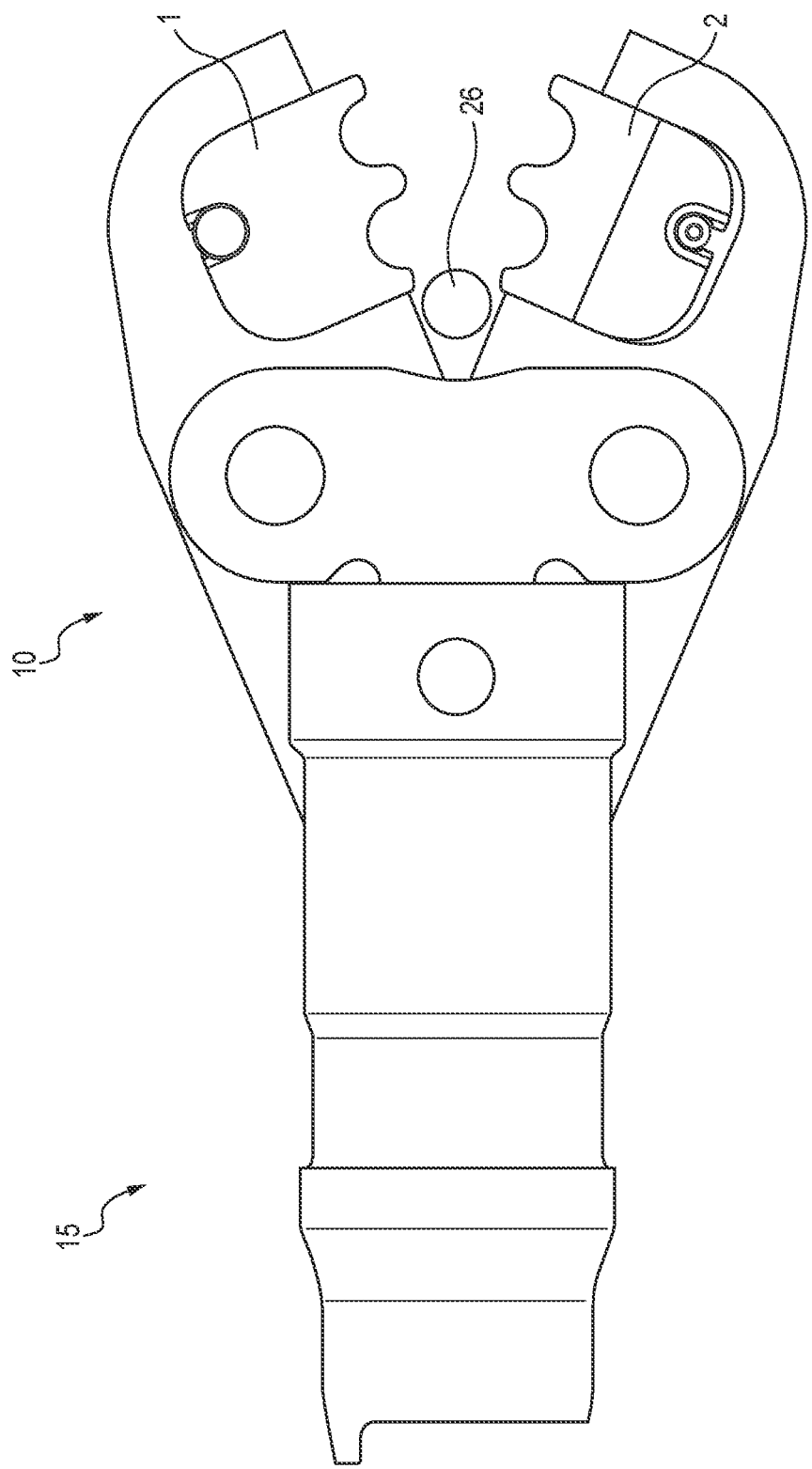
FIG. 3 is a schematic side elevational view of the shearing tool head and power tool of FIG. 1 in which the rod is shown in a position that may damage the dies.

In the prior art and as illustrated in FIG. 2, a threaded rod 26 located between the dies 1, 2 may need to be positioned by a user into opposed indented portions of the dies 1, 2 in order to be sheared. When located further from the indented portions as shown in FIG. 3, the rod 26 may cause teeth of opposing dies 1, 2 to jam, thereby preventing shearing of the rod 26. This situation can also potentially result in damage to the die(s) 1, 2 and/or the tool head 10.

The present subject matter provides tool heads, dies, and systems, which incorporate significant improvement over the prior art, for shearing threaded rod and similar workpieces. The present subject matter also provides related methods of shearing using the tool heads and dies.

Tool Heads and Power Assemblies

Figure 4:
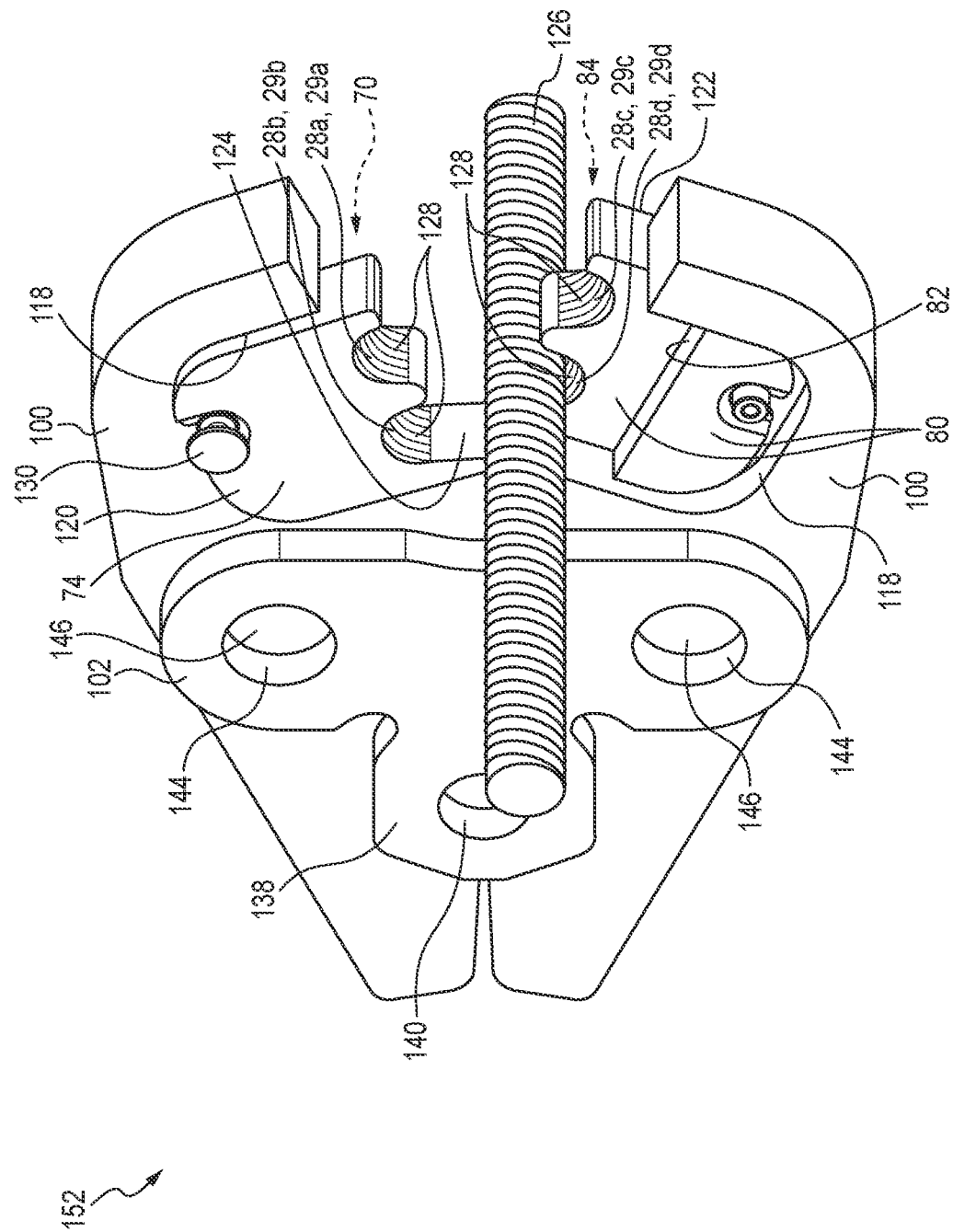
FIG. 4 is a schematic front perspective view of an embodiment of a shearing tool head and dies in accordance with the present subject matter, and a rod to be severed.
Figure 4A:
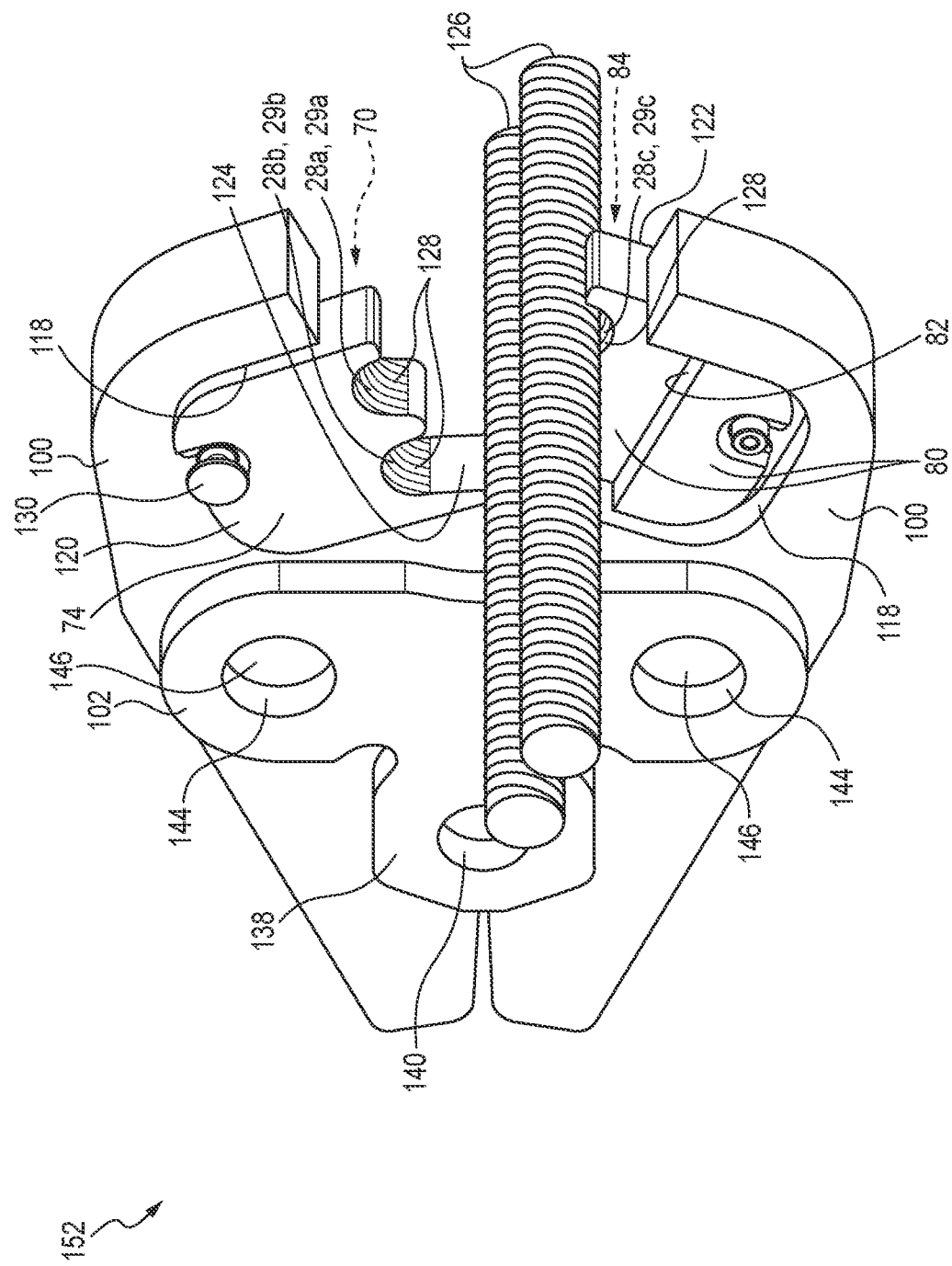
FIG. 4A illustrates the shearing tool head and dies of FIG. 4, and two rods to be severed.
Figure 5:
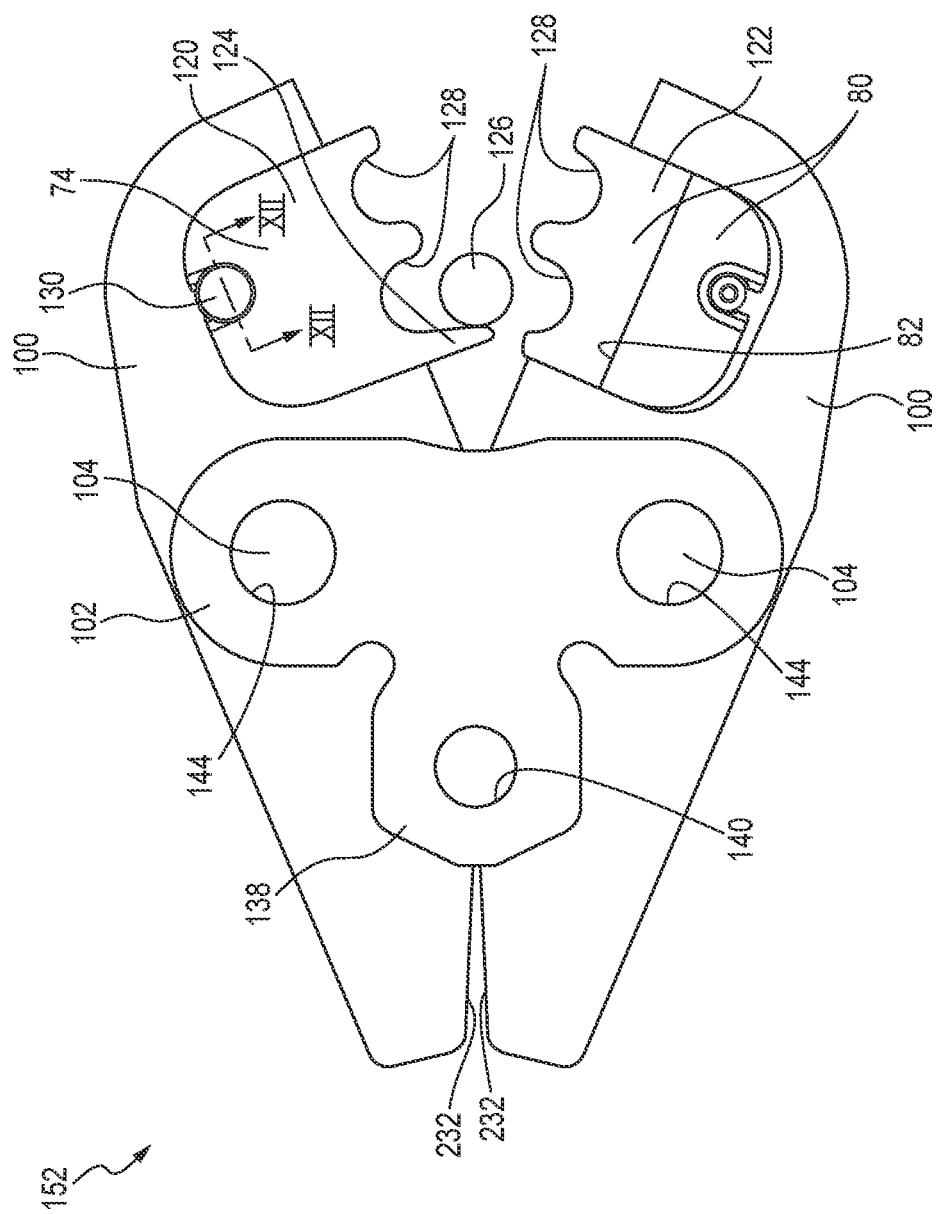
FIG. 5 is a schematic side elevational view of the shearing tool head of FIG. 4 illustrating positioning and alignment of the rod prior to severing.
Figure 6:
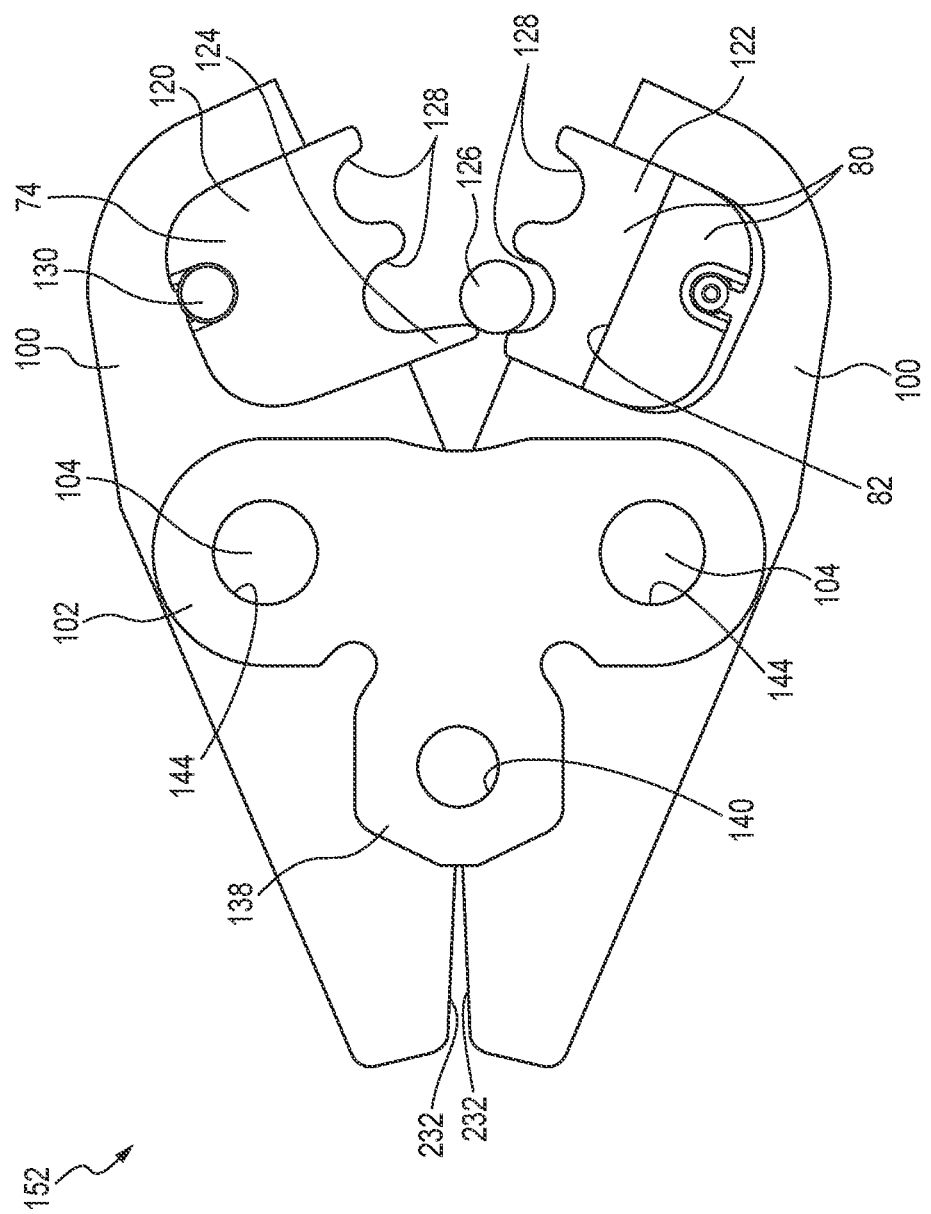
FIG. 6 is a schematic side elevational view of the shearing tool head of FIG. 4 in which the rod is guided to a proper position relative to the dies.

Generally, FIGS. 4-7A illustrate an embodiment of a tool head 152 in accordance with the present subject matter. The tool head 152 comprises a spaced-apart pair of sideplates 102, one of which is visible in each of FIGS. 4-6, and the other of which is visible in FIGS. 7 and 7A. The second sideplate 102 (FIGS. 7 and 7A) is located on an opposite side of the tool head 152 relative to the first sideplate 102 (FIGS. 4-6). The tool head 152 also comprises a pair of jaws, i.e., an upper jaw and a lower jaw (FIGS. 4-7A), each identified by the reference numeral 100. The jaws include a first jaw 100 and a second jaw 100. Each jaw 100 of the pair of jaws is pivotally moveable about its own respective pin 104 shown in FIGS. 5 and 6 and described in greater detail below. FIGS. 4, 4A, 7, and 7A illustrate the tool head 152 with the pins 104 removed. The tool heads and in particular the tool head 152, are also described in greater detail below.

Typically, the tool heads are driven or powered by a selectively engageable driving assembly or power tool. A wide array of power tools can be used to drive the tool head. Any standard press tool such as RIDGID RP340 or RP318 available from Ridge Tool Company and particularly which uses a fork and sliding pin system for the attachment of jaws or tool heads to the press tool can be used. It is also contemplated that press tools manufactured and/or supplied by others could potentially be used to drive or power the tool heads of the present subject matter. It is further contemplated that other power tools besides press tools could be used so long as the tool includes one or more actuators that can impart pivotal movement to the pair of jaws of the tool heads described herein. Generally, the rod shearing tool head is positioned inline with the power tool to apply as much as 130 kN in shearing applications for example. It will be understood that different embodiments could generate greater force or less force.

Figure 14:
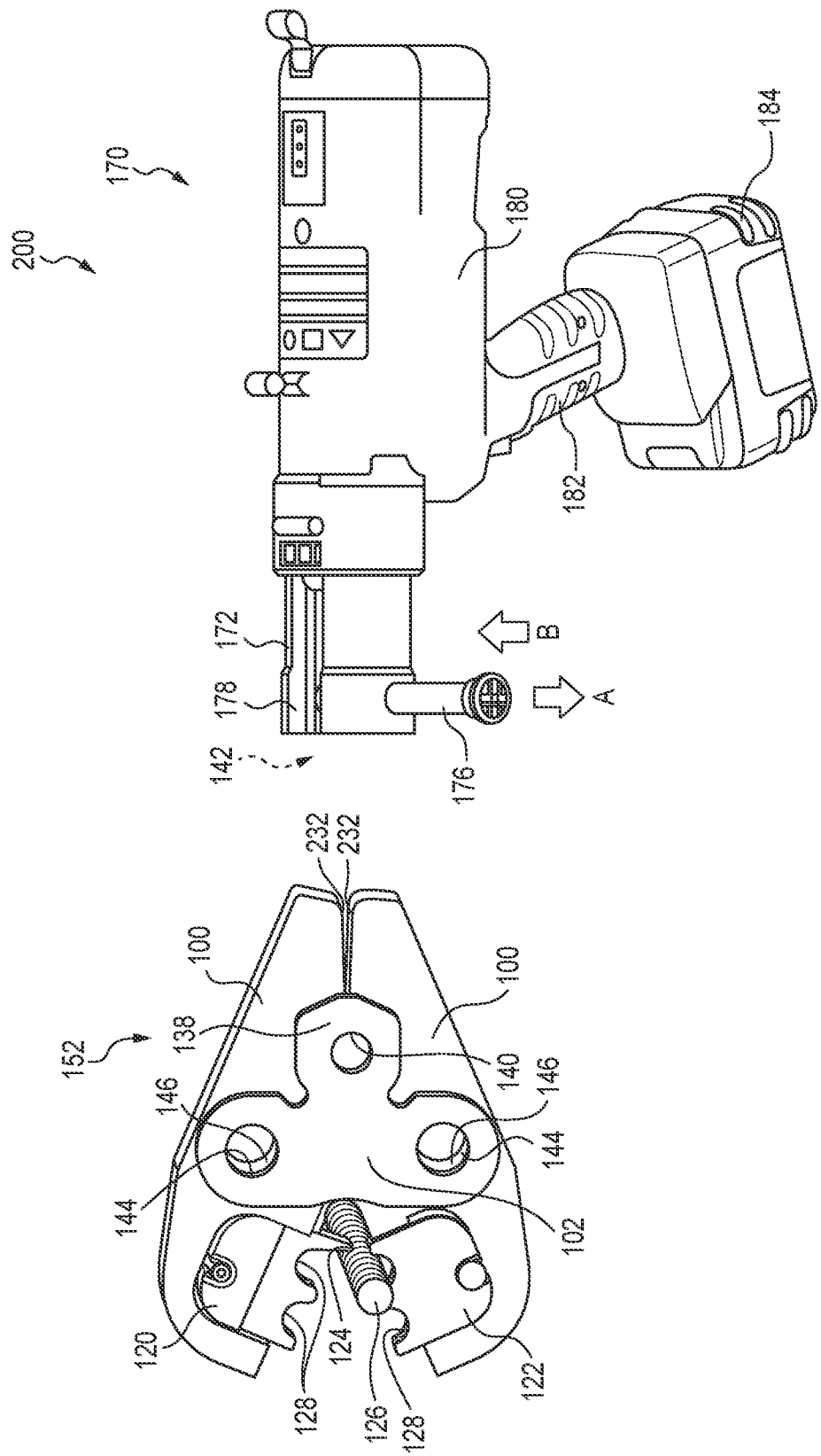
FIG. 14 is an illustration of a partially disassembled system in accordance with an embodiment of the present subject matter including a tool head with dies and a pressing tool.

FIG. 14 schematically illustrates a tool system 200 comprising a shear tool or tool head 152 and a power tool such as for example a press tool, power tool, or power assembly 170. In many embodiments, the shear tool 152 is selectively engageable with the press tool 170. FIG. 14 shows the tool head 152 detached and separate from the press tool 170. (Components of a conventional press tool, which may be used in combination with an embodiment of the shearing mechanism described in the appended claims, are disclosed and described in U.S. Pat. No. 7,124,608 to Goop, assigned to Emerson Electric Co.; see also U.S. Pat. No. 10,532,481 to Kundracik et al., assigned to Ridge Tool Company.) The tool head 152 is as previously described herein and depicted without pins 104.

The illustrated press tool 170 (FIG. 14) comprises a body, enclosure, or housing 180, a handle 182, a battery or power pack 184, and a fork or nose 172 adapted for engaging a tool, tool head, or like assembly. Disposed within the interior of the housing 180 is an electric motor and drive assembly (not shown) for imparting a drive force to select components of the tool head 152, such as the illustrated pair of jaws 100, engaged and received at the fork or nose 172 located at the forward end of the tool 170. The fork 172 typically includes a selectively displaceable pin or bolt 176 which can be pulled outward or moved laterally to allow a tool or tool head to be received within the fork 172, and pushed or moved laterally in an opposite direction to engage and secure the tool or tool head within the fork 172. Engagement between the shear tool 152 and the press tool 170 is enabled by pulling the pin 176 in the direction of arrow A. This allows rear or proximal ends of the pair of jaws 100 to be received in a channel 178 of the fork 172 of the press tool 170. The shear tool head 152 is urged toward the press tool 170 until apertures 140 in the sideplates 102 of the tool 152, are aligned with the pin 176. Upon positioning of the tool head 152 with the press tool 170 as shown in FIG. 14, the pin 176 is urged in the direction of arrow B such that the pin 176 is inserted in the apertures 140 of the tool head and an aperture 142 in the fork 172 (see FIGS. 8-10) to thereby engage the tool head 152 with the press tool 170. References herein to "proximal" and "distal" are with regard to the location of the power tool, e.g., press tool 170. Thus for example, proximal portions of a component of the tool head 152 are closer to the power tool, as compared to distal portions of the component.

The tool head 152 is adapted in certain embodiments, for use with a power or press tool such as the RIDGID RE 6 electrical cable termination tool available from Ridge Tool Company which uses a cylindrical interface and a linearly extendable ram for the attachment and actuation of heads to the press tool. It is also contemplated that press tools manufactured and/or supplied by others could potentially be used to drive or power the shear tool heads of the present subject matter. It is further contemplated that other power tools besides the noted press tool could be used so long as the tool includes one or more actuators that can impart linear movement to component(s) of the tool heads described herein.

In certain embodiments, the tool head 152 can include a press tool interface (not shown) for selective and releasable engagement with a press tool such as the noted RE 6 press tool. In many versions, the press tool interface can be suitably configured to utilize a configuration including a shank part 13 described in U.S. Pat. No. 9,573,335 to Schweizer et al. In many versions, the press tool interface is in the form of a generally cylindrical member defining a plurality of ridges and depressions along its outer circumferential surface. It will be understood that the tool head 152 is not limited to any particular configuration and instead may be sized and/or shaped to be used with a wide array of press tools or other tools.

Figure 15:
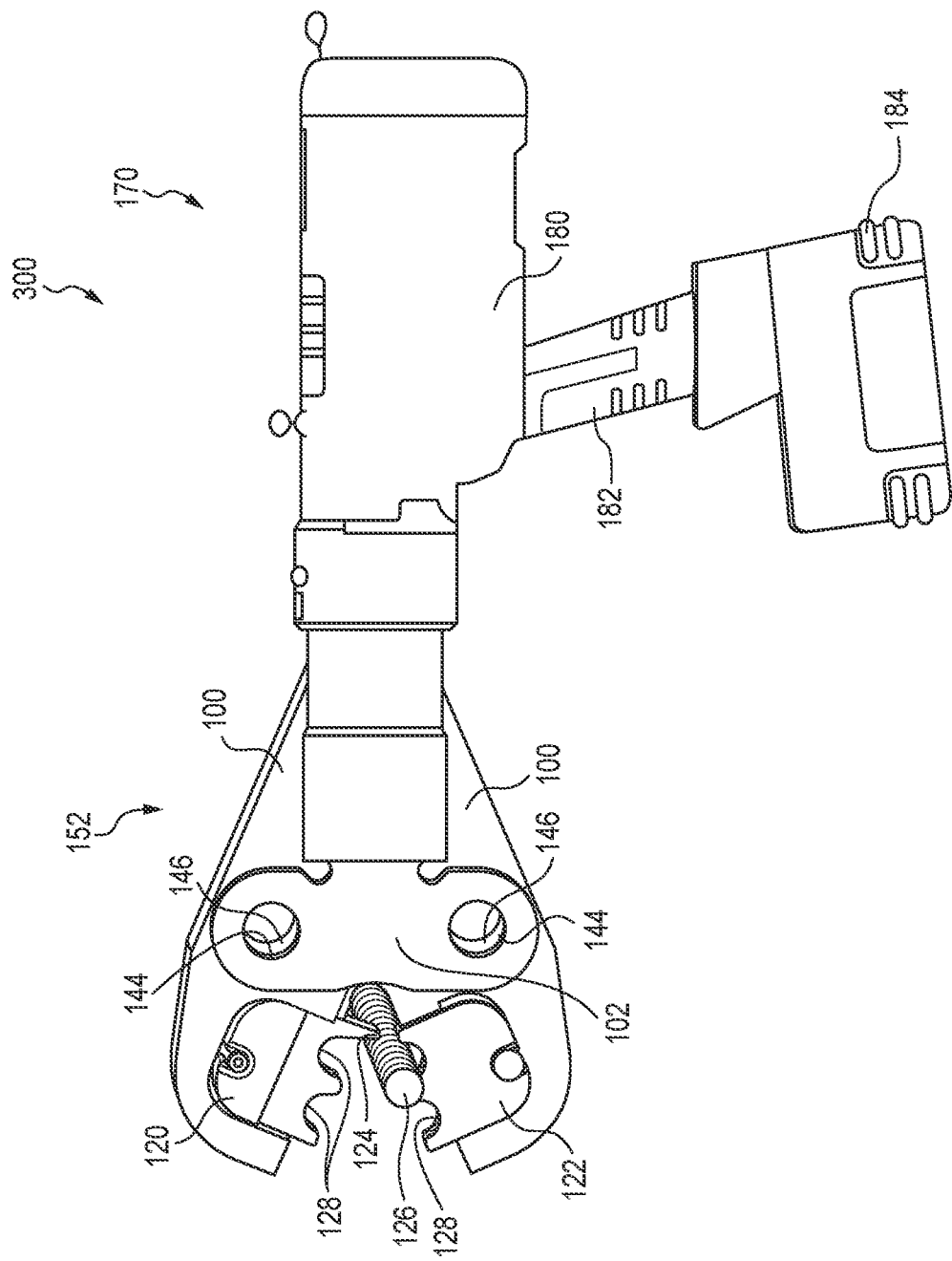
FIG. 15 is an illustration of a system in accordance with yet another embodiment of the present subject matter including a tool with a non-detachable tool head with dies.

Although many embodiments of the present subject matter are in the form of a tool head that is selectively detachable or separable from a power tool or press tool, it will be understood that the present subject matter also includes tools and/or tool systems in which the tool head or primary components thereof, is affixed or incorporated with a power tool such that the tool head or its primary components are not readily detachable or separable, i.e., non-detachable, from the remaining portion of the power tool. FIG. 15 schematically depicts a tool system 300 comprising a power assembly similar to the previously described power tool 170 and a non-detachable tool head 152. As will be understood, in this embodiment, the power tool 170 is free of the previously described selectively displaceable pin or bolt 176 and associated apertures in the fork and the tool head 152.

Tool Heads and Dies

Figure 7:
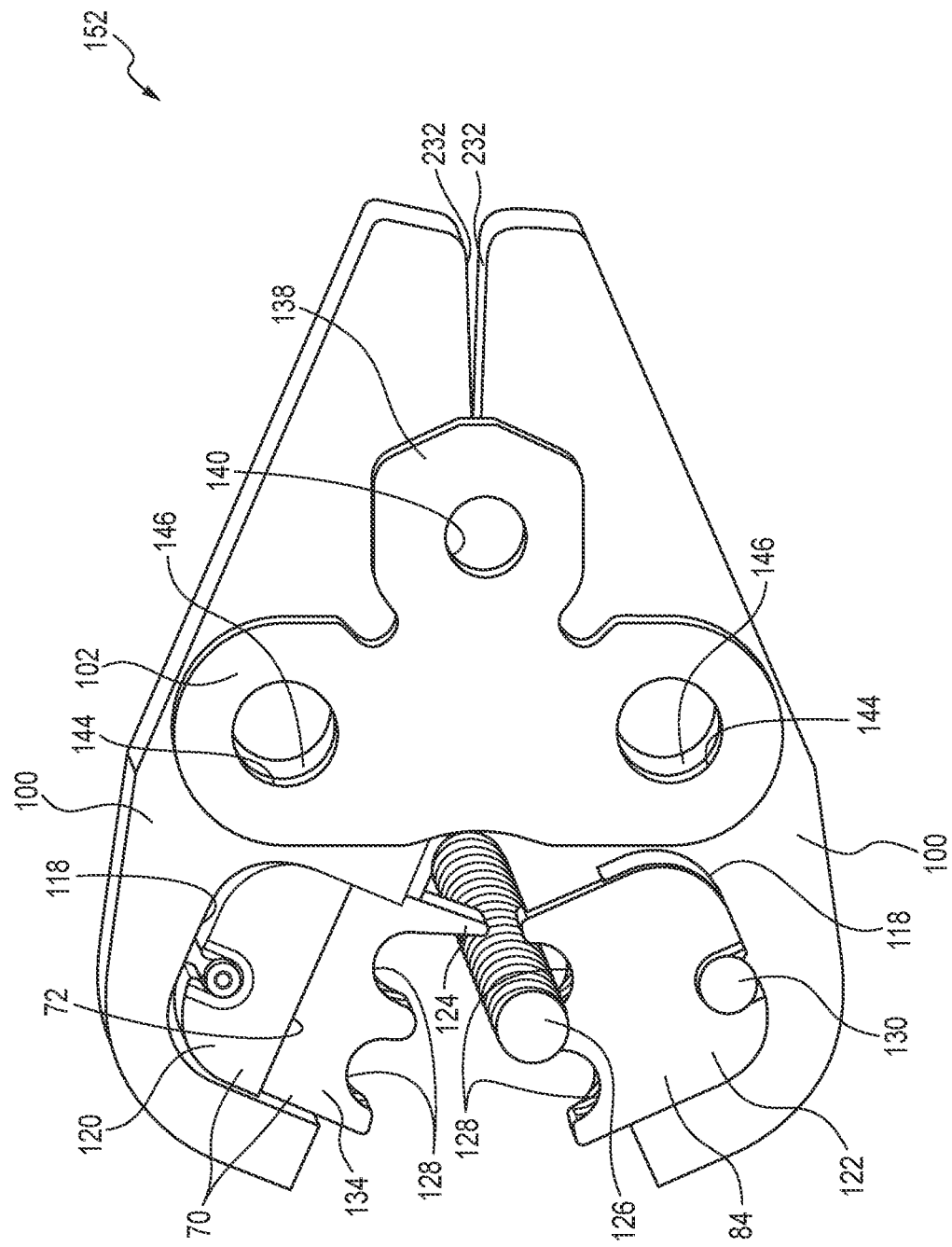
FIG. 7 is a schematic rear perspective view of the shearing tool head of FIG. 4, and a rod to be severed.
Figure 7A:
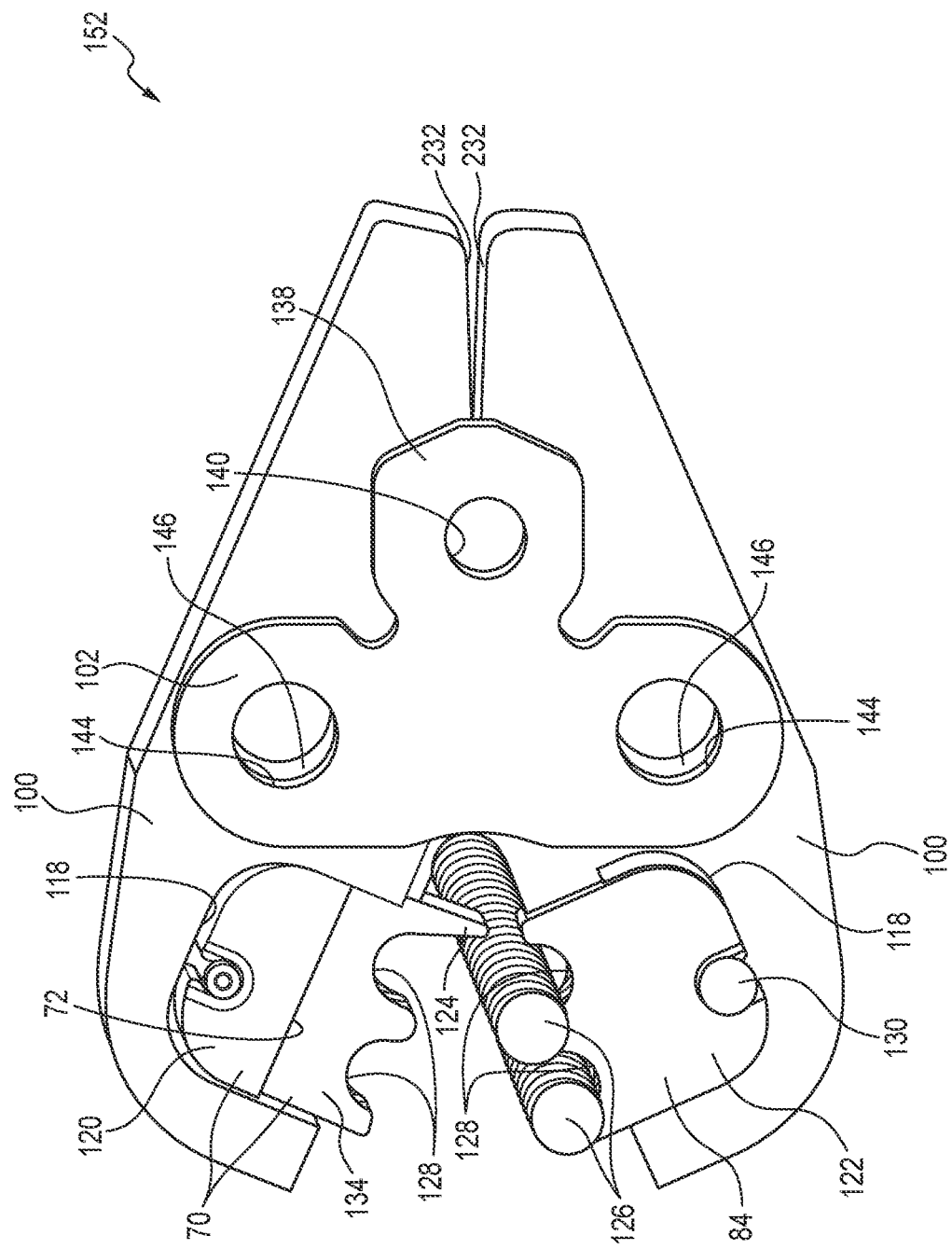
FIG. 7A illustrates the shearing tool head of FIG. 7, and two rods to be severed.

In accordance with the present subject matter, the dies are dissimilar from each other and in certain embodiments are as shown in the referenced figures. FIGS. 4 and 4A are a front perspective views of an embodiment of a tool head 152 and a pair of dissimilar dies 120, 122 in accordance with the present subject matter. FIG. 4 shows a single rod 126 to be severed. FIG. 4A shows two rods 126 to be severed. In FIG. 5 a stop member 124 or projection is shown that is defined by at least one of the dies (120 or 122) and more particularly by a first or upper die 120. The projection 124 urges an elongated rod or workpiece 126 into capture region(s) 128 defined by portions of the upper die 120 and an opposing die and more particularly by a second or lower die 122, the capture regions 128 being contoured and dimensioned to allow a peripheral portion of elongated rod or workpiece 126 to be captured between dies 120 and 122, as shown in FIGS. 5 and 6. As shown in FIGS. 6, 7, and 7A, dissimilar projections defined by the upper and lower dies 120, 122 are configured and/or dimensioned to prevent the rod 126 from becoming positioned therebetween and thereby jam the assembly. The dissimilar projections are described in greater detail herein. FIG. 7 shows a single rod 126 to be severed. FIG. 7A shows two rods 126 to be severed.

Figure 11:
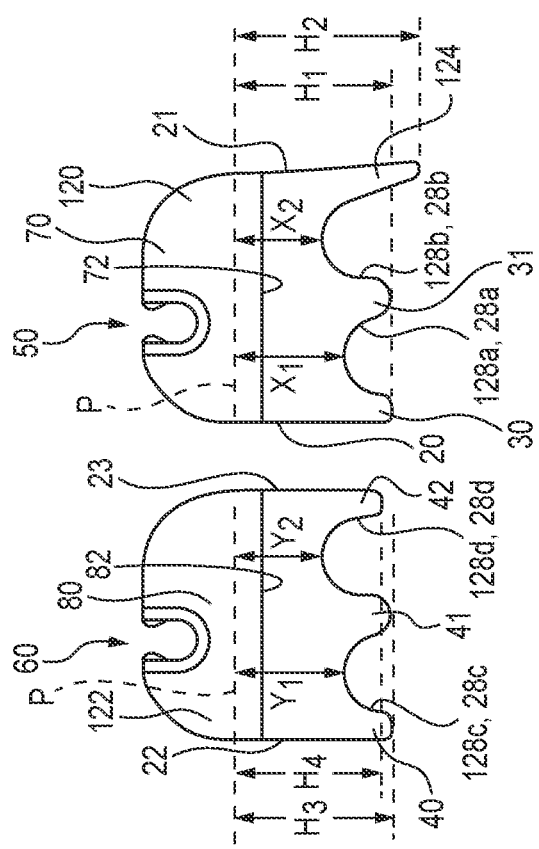
FIG. 11 illustrates a detailed side elevational view of the dies in accordance with an embodiment of the present subject matter.

FIG. 11 is a detailed view illustrating an embodiment of the pair of dies 120, 122 in accordance with the present subject matter. The first or upper die 120 defines a front or distal face 20 and a rear or proximal face 21. The first die 120 also defines a front projection 30 extending along the front face 20, a stop member 124 extending along the rear face 21, and a medial projection 31 located between the front projection 30 and the stop member 124. The second or lower die 122 defines a front face 22 and a rear face 23. The second die 122 also defines a front projection 40, a rear projection 42, and a medial projection 41 located between the front projection 40 and the rear projection 42.

Referring further to the figures, the die 120 defines an interior face 70 (FIGS. 7, 7A, and 11), an oppositely directed exterior face 74 (illustrated in FIGS. 4-6, 8-10A), and a ledge 72 (FIGS. 7, 7A, 11) extending across or along a portion of the interior face 70. Similarly, the die 122 defines an interior face 80 (FIGS. 4-6, 8-11), an oppositely directed exterior face 84 (FIGS. 7 and 7A), and a ledge 82 (FIGS. 4-6, 8, 9, 10, and 11) extending across or along a portion of the interior face 80.

Each die 120 and 122 defines one or more capture regions 128 (generally shown in FIGS. 4 through 9) for receiving and contacting an elongated rod to be sheared. (While these embodiments illustrate capture regions that are semi-circular, other embodiments of the present subject matter contemplate capture regions that are not semi-circular.) Specifically and referring to FIG. 11, the first die 120 defines a first capture region 128a between the front projection 30 and the medial projection 31. The first die 120 also defines a second capture region 128b between the medial projection 31 and the stop member 124. Similarly, the second die 122 defines a first capture region 128c between the front projection 40 and the medial projection 41. The second die 122 also defines a second capture region 128d defined between the medial projection 41 and the rear projection 42. The first die 120 also defines retention provisions 50 located generally opposite from the capture regions 128a and 128b. The second die 122 similarly defines retention provisions 60 located generally opposite from the capture regions 128c and 128d.

In the embodiments, the various projections, the stop member, and/or the capture regions exhibit particular proportions and/or features. In one embodiment, the first capture region 128a of the first die 120 defines an arcuate face 28a, which may include one or more thread portions as described in greater detail herein. The second capture region 128b of the first die 120 also defines an arcuate face 28b, which may include one or more thread portions as described in greater detail herein. Similarly, the first capture region 128c of the second die 122 defines an arcuate face 28c, which may include one or more thread portions as described in greater detail herein. The second capture region 128d also of the second die 122 defines an arcuate face 28d, which may include one or more thread portions as described in greater detail herein.

In the embodiments, the first capture region 128a and the second capture region 128b of the first die 120 are each semi-circular. In particular versions, the capture regions 128a and 128b of the first die 120 are semi-circular and have the same diameter. Similarly in certain versions, the first capture region 128c and the second capture region 128d of the second die 122 are each semi-circular and may have the same diameter. However, it will be understood that the present subject matter includes dies having capture regions with differing diameters, spans, and/or shapes.

In particular embodiments, the height of the front projection 30 and the medial projection 31 of the first die 120 are equal as measured from a die back-plane P. The die back-plane P contacts a surface within a die recess 118 of a corresponding jaw 100 upon positioning the die in the jaw. In this embodiment, the height of the front projection 30 and the medial projection 31 is shown in FIG. 11 as height $H_1$. The height of the stop member 124 shown as $H_2$, is greater than the height of at least one of the front projection 30 and the medial projection 31, and in certain versions, greater than the height of both of the front projection 30 and the medial projection 31. The height of the front projection 40 and the medial projection 41 of the second die 122 are equal as measured from a die back-plane P. In this embodiment, the height of the front projection 40 and the medial projection 41 is shown in FIG. 11 as height $H_3$. The height of the rear projection 42 shown as height $H_4$, is less than the height of at least one of the front projection 40 and the medial projection 41, and in certain versions, less than the height of both of the front projection 40 and the medial projection 41. Moreover, for still other embodiments of the pair of dies 120 and 122 (in addition to what is illustrated herein), the height of the front and medial projections 30 and 31 of the one die 120 may be greater than, less than, or equivalent to the height of the front and medial projections 40 and 41 of the other die 122.

In certain embodiments, the distance relative to the die back-plane P of the first capture region 128a of the first die 120, shown as $X_1$ in FIG. 11, is greater than the distance relative to the die back-plane P of the second capture region 128b, shown as $X_2$. Similarly, the distance relative to the die back-plane P of the first capture region 128c of the second die 122, shown as $Y_1$ in FIG. 11, is greater than the distance $Y_2$ relative to the die back-plane P of the second capture region 128d in the second die 122. In certain versions, the noted distances of the first capture region and a second capture region are different and selected so that severing or shearing of two rods occurs at different phases or times of the jaws closing. The illustrated configuration reduces the amount of force required for severing/shearing as compared to a prior art configuration in which two rods are severed/sheared concurrently. It will be understood, the present subject matter is not limited to the illustrated features and/or characteristics and includes dies having different configurations. The distances of capture regions taken relative to a prior art die back-plane are the shortest distances possible. Typically, the illustrated distances are taken transversely from the die back-plane P.

As noted, in certain versions, the arcuate faces such as arcuate faces 28a and/or 28b of the one die 120; may define thread portions. Moreover, the arcuate faces 28c and/or 28d of the other die 122 may similarly define thread portions. The thread portions are in the form of exposed surface area regions along the capture regions 128 and in particular, the arcuate faces 28a and/or 28b of the one die 120 as well as the arcuate faces 28c and/or 28d of the other die 122, include threaded engagement regions. The particular thread configuration and/or profile is typically selected to correspond to the thread configuration of threaded rod(s) to be sheared. In many applications, the thread used in threaded rod is, for English units, a common thread type which is ½"-13 (meaning, nominally the rod is one-half inch in diameter and there are thirteen threads per inch). Another common thread type is ⅜"-16. Also, for metric units, a common thread type is M8×1.5 (meaning, eight millimeters nominal diameter and there is a thread pitch every 1.5 millimeters). FIG. 4 schematically illustrates a threaded region 29a defined along the arcuate face 28a, and a threaded region 29b defined along the arcuate face 28b for the one die 120, as well as a threaded region 29c defined along the arcuate face 28c, and a threaded region 29d defined along the arcuate face 28d of the other die 122. It will be understood that the present subject matter includes dies free of threads or threaded regions along the capture regions.

Figure 16:
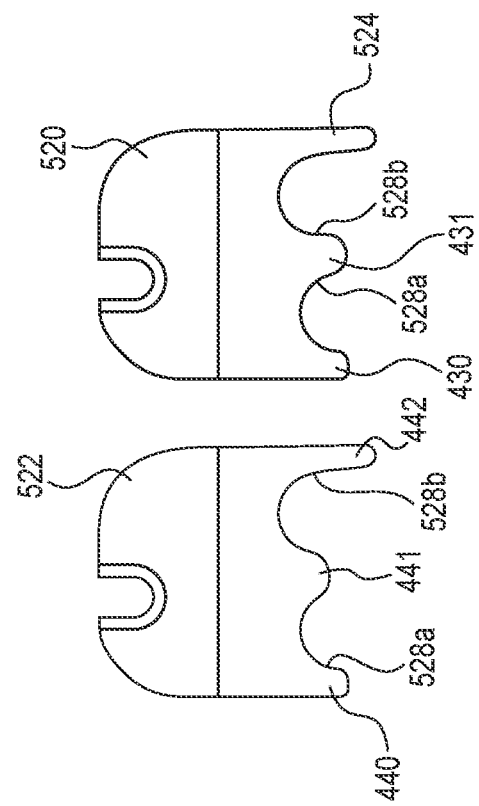
FIG. 16 illustrates another embodiment of dies in accordance with the present subject matter.

The present subject matter also provides dies having particular combinations of features such as, but not limited to the following. In one embodiment shown in FIG. 16, at least two dies are provided which include a first die 520 having a front projection 430, a medial projection 431, and a rearwardly located stop member 524. The first die defines a first capture region 528a between the front projection 430 and the medial projection 431, and a second capture region 528b between the medial projection 431 and the stop member 524, as previously described herein. The at least two dies also include a second die 522 having a front projection 440, a medial projection 441, and a rearwardly located stop member 442. The second die 522 defines a first capture region 528a between the front projection 440 and the medial projection 441, and a second capture region 528b between the medial projection 441 and the stop member 442. Thus, in this embodiment, both of the first die 520 and the second die 522 include rearwardly located stop members 524, 442. The dies 520, 522 may include one or all of the various features and aspects previously described and illustrated in association with dies 120, 122. The dies 520, 522 are non-identical as the medial projection 441 of the second die has a different configuration than the medial projection 431 of the first die 520.

Figure 17:
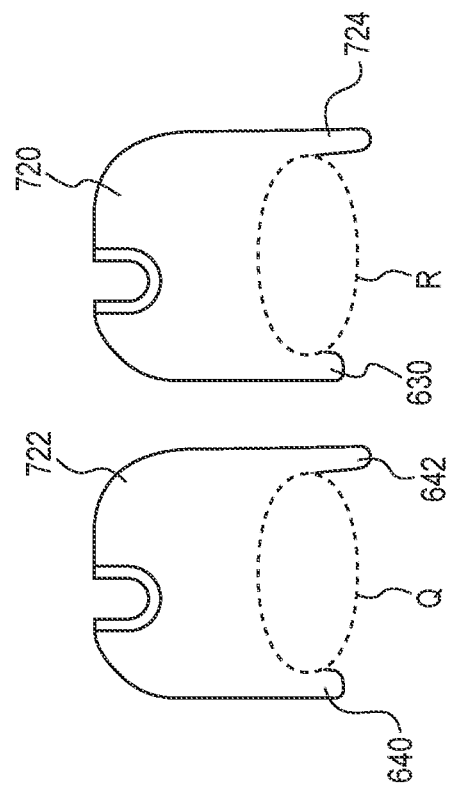
FIG. 17 illustrates yet another embodiment of dies in accordance with the present subject matter.

In another embodiment shown in FIG. 17, at least two dies are provided which include a first die 720 having a front projection 630 and a rearwardly located stop member 724. The first die defines a first region R between the front projection 630 and the stop member 724. The at least two dies also include a second die 722 having a front projection 640 and a rearwardly located stop member 642. The second die 722 defines a second region Q between the front projection 640 and the stop member 642. The first and second dies are configured such that the first region R of the first die 720 is non-identical to the second region Q of the second die 722. This is an example of the dies having dissimilar projections. The dies 720, 722 may include one or all of the various features and aspects previously described and illustrated in association with dies 120, 122.

For versions of the dies utilizing threaded regions, as noted the threads correspond to or match, the thread(s) of the rods to be severed or sheared. Thus, in these embodiments, upon positioning a threaded rod within a capture region of a die, preferably, the threads defined along the die for example threaded regions 29a and 29b, contact and are aligned with, the threads of the rod to be sheared.

Figure 8:
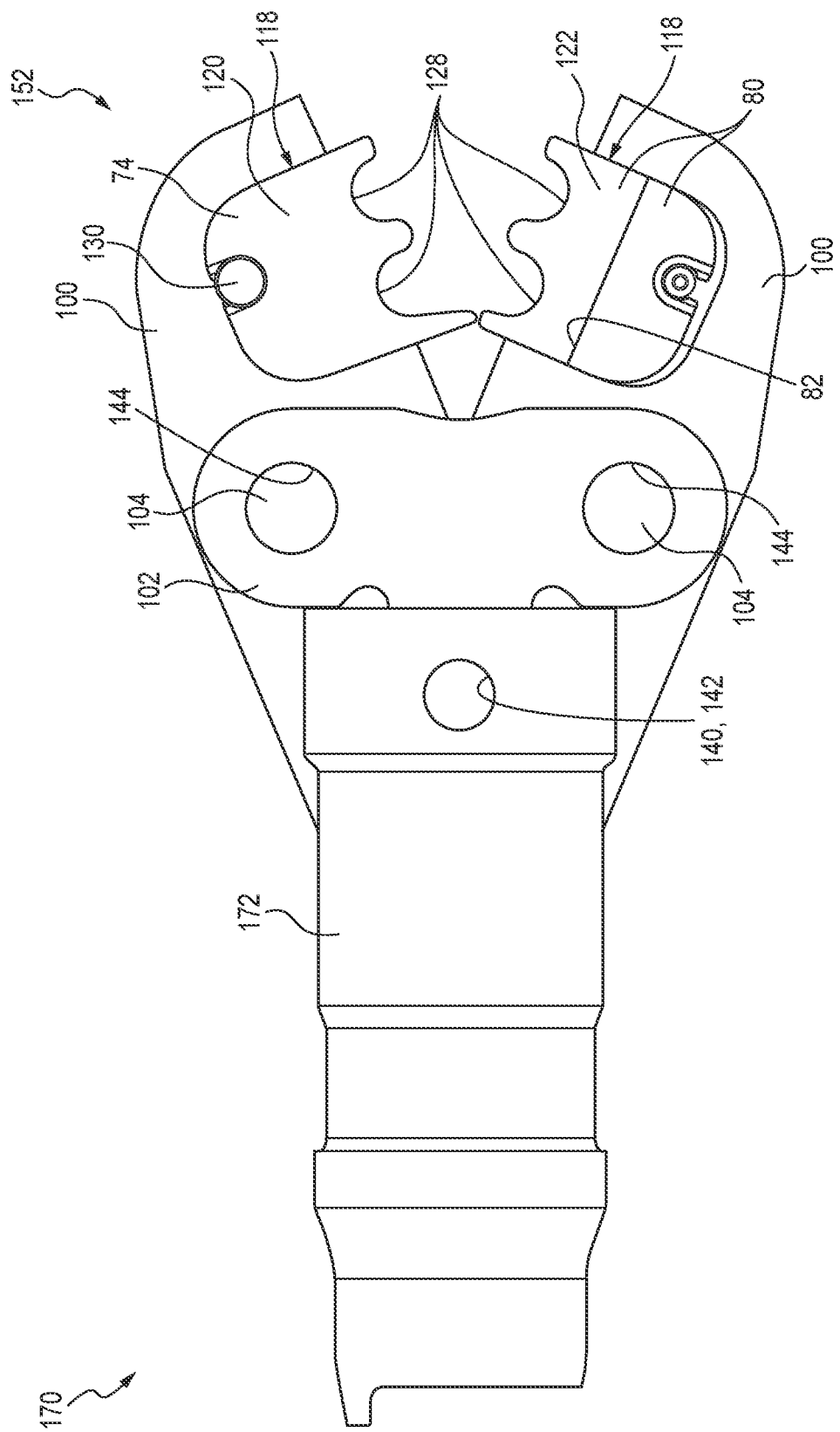
FIG. 8 is a schematic side elevational view of the shearing tool head and dies of FIGS. 4-7 in which the tool head is engaged with a power tool in accordance with the present subject matter.
Figure 8A:
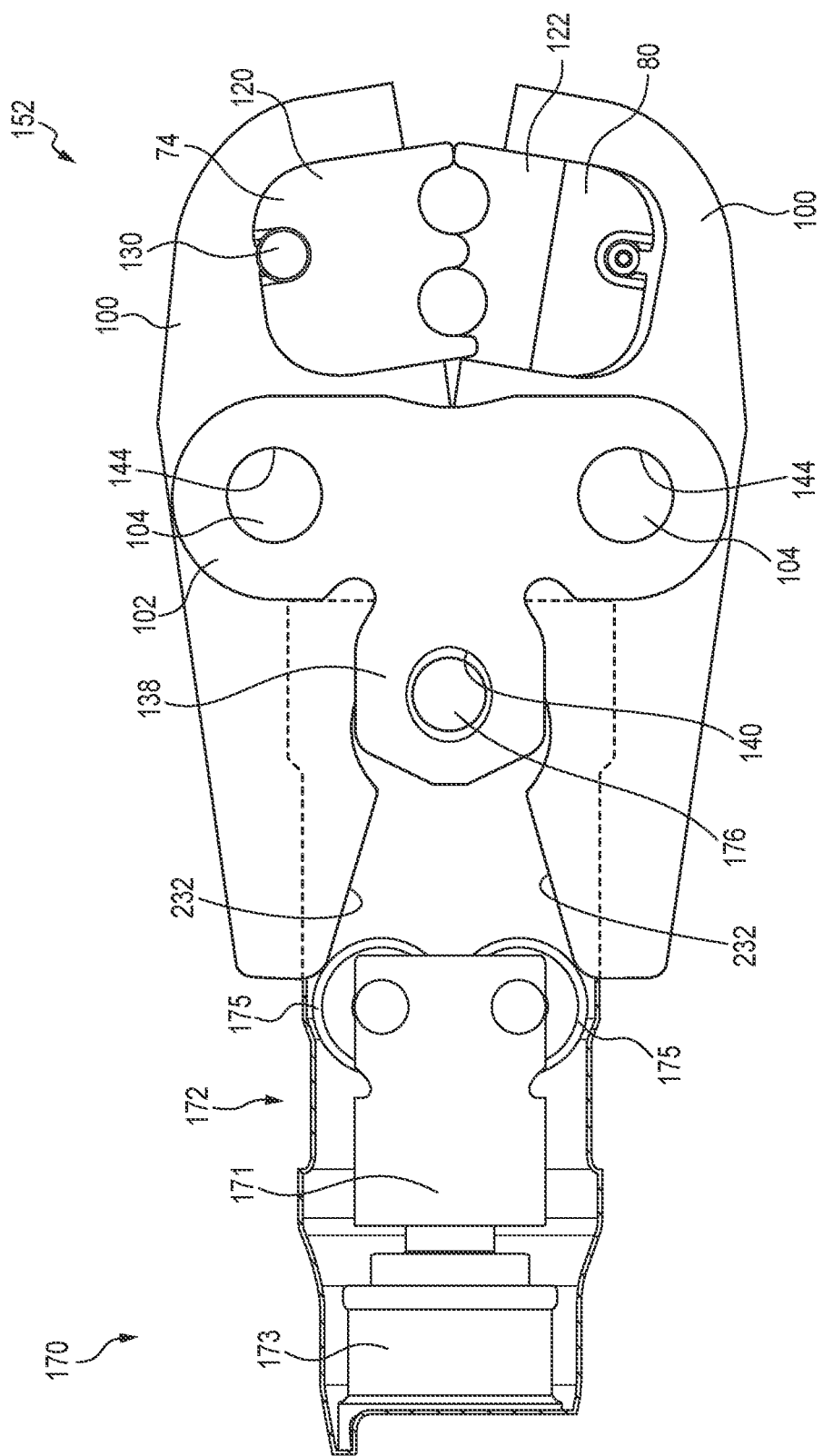
FIG. 8A is a schematic cross-sectional view of the shearing tool head, power tool and dies of FIG. 8.
Figure 9:
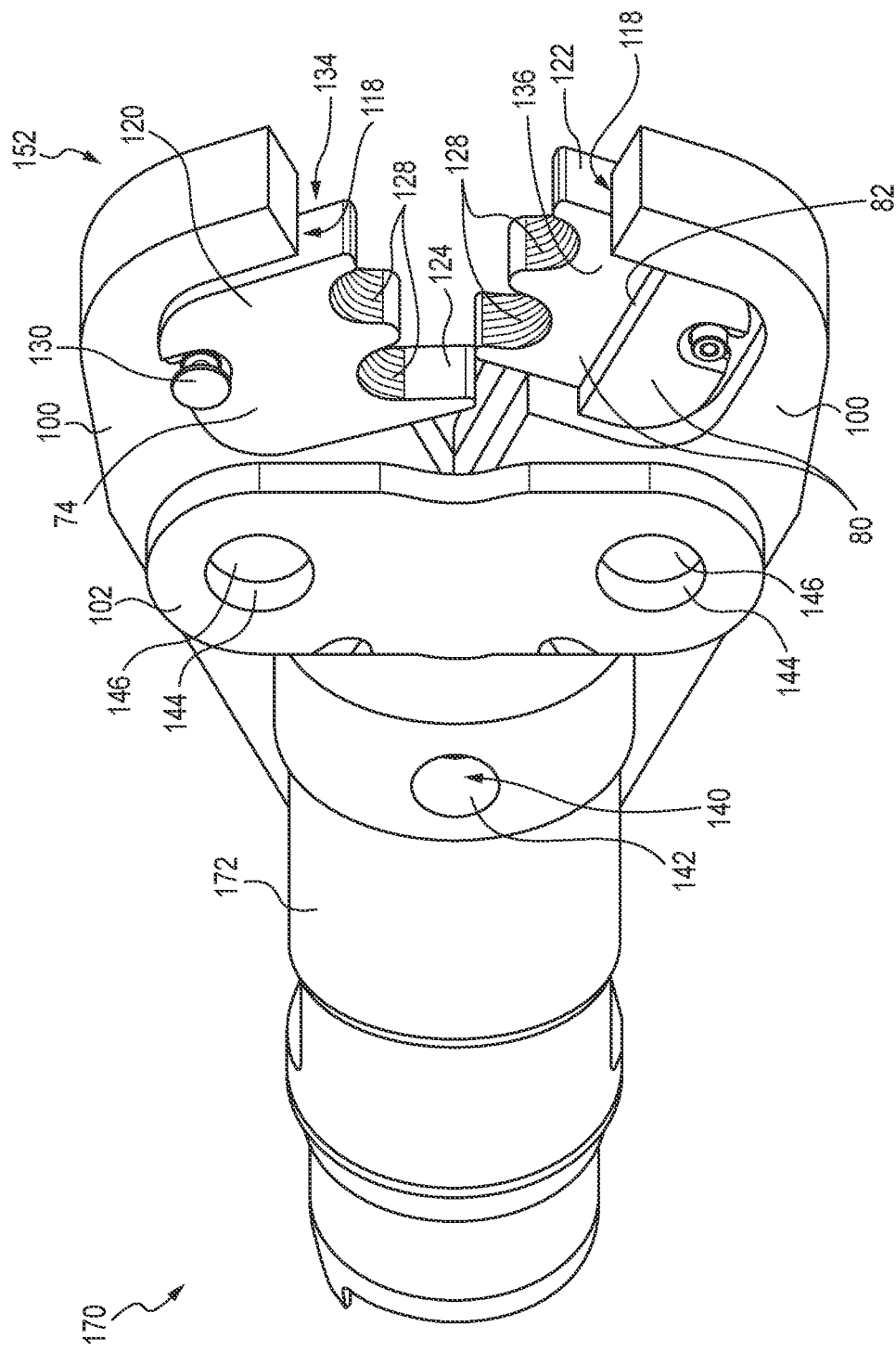
FIG. 9 is a front perspective view of the shearing tool head, power tool, and dies of FIG. 8.

Additional details of the tool head and various components are shown in FIGS. 8-10A. Specifically, referring to FIGS. 8-10A, a tool head 152 comprising a pair of jaws 100 is shown. The jaws 100 are positioned between a pair of sideplates 102. Each jaw 100 is movably retained with the sideplate 102 by a pin 104 as shown in FIGS. 8, 8A, 10, and 10A. FIG. 9 shows the pins 104 removed. Each pin 104 extends through an aperture 144 in one of the spaced-apart pair of sideplates 102, through an aperture 146 in one of the pair of jaws 100, and through another aperture 144 in the other of the spaced-apart pair of sideplates 102. The jaws 100 pivot about the pins 104. (Compare FIGS. 8, 8A, and 10, 10A.) The tool head 152 can be connected to the fork 172 of a driving tool 170 (as depicted in FIGS. 8, 8A, and 14), by sliding ears 138 of the sideplates 102 into the channel 178 (FIG. 14) of the fork 172 and pinning apertures 140 in the ears 138 and aperture 142 in the fork 170 via the pin 176 of the fork 172. The jaws 100 can be biased open or closed by a torsion spring held in place by a pin between grooves in each jaw. These aspects are described in greater detail herein. Rollers from the driving tool 170 advance toward the front of the tool head 152 and roll along cams 232 of each jaw 100 (FIGS. 10 and 10A) causing the front end of the jaws 100 to close. On the front end of the jaws 100, die recesses 118 (FIG. 8) are provided on opposing faces of the jaws 100 that matingly receive dies such as dies 120, 122 for example. In certain versions of the present subject matter, pushing a spring loaded pin 130 movably retained with each jaw 100, aligns a smaller diameter of the spring loaded pin 130 with a narrow slot and aperture defined in each die and associated with the retention assemblies 50, 60.

Figure 13:
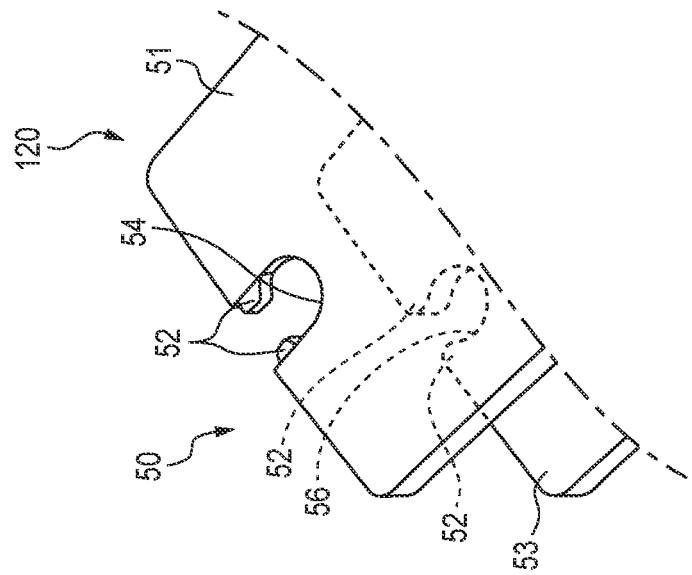
FIG. 13 is a schematic partial perspective view of a die showing an engagement region for selective coupling with the retention assembly of the tool head.
Figure 12:
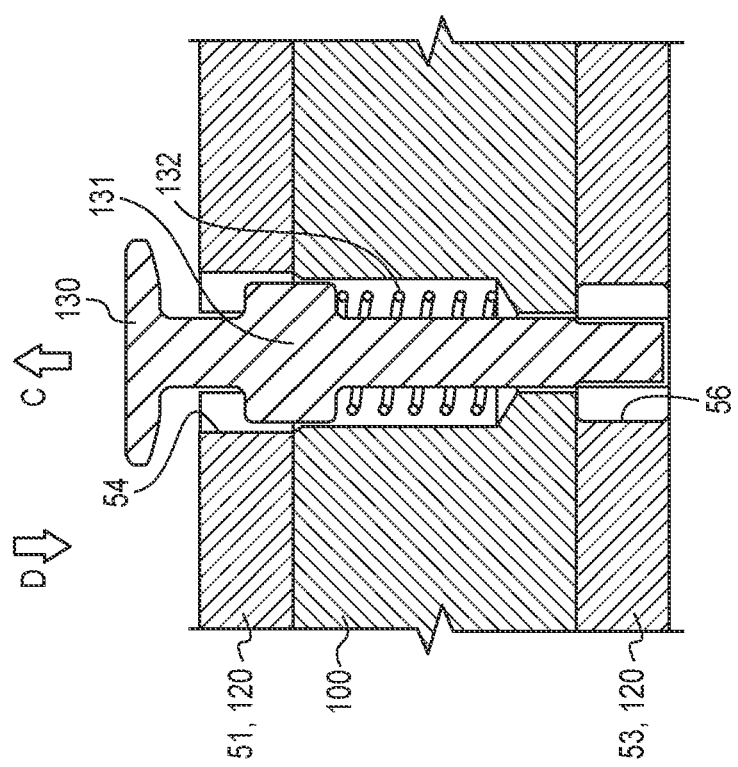
FIG. 12 is a schematic partial cross-sectional view taken across line XII-XII in FIG. 5 of an embodiment of a retention assembly for engagement of a die to the tool head.

Specifically, FIGS. 12 and 13 illustrate releasable engagement between a die 120 and a jaw 100. FIG. 12 is a schematic partial cross-sectional view taken across line XII-XII in FIG. 5. FIG. 13 is a schematic partial perspective view of a representative die such as die 120 depicted in FIG. 5 showing engagement regions for selective coupling with the retention assembly 50. Die 120 defines aperture 54 on one side member 51 and aperture 56 on another side member 53. One or both of the side member(s) 51, 53 include fingers 52 that limit radial access to the aperture(s) 54, 56. Die 120 is engaged to jaw 100 by positioning the jaw 100 between the side members 51, 53 of the die 120 and aligning the pin 130 with the apertures 54, 56. As will be understood by further reference to FIG. 12, upon pushing the spring loaded pin 130 in the direction of arrow D, a larger diameter portion 131 of the pin 130 is positioned entirely within the jaw 100. This enables the die 120 to be fully seated with the jaw 100 such that the die back-plane P contacts a surface within the die recess 118. Upon seating and alignment of the apertures 54, 56 with the pin 130, release of the pin causes displacement of the pin 130 in the direction of arrow C due to biasing of the spring 132. A corresponding retention assembly 60 can be used for the die 122 and the other jaw 100.

Furthermore, for attaching the dies to the jaws, in certain embodiments the present subject matter may utilize a push to release system similar to that of a W-die shown in FIGS. 12 and 13. W-dies are known in the art and are used for example on the present Assignee's UC60 product.

As noted, in certain embodiments, the dies 120, 122 each have two threaded capture regions 128, and/or one of the dies 120 has a stop member 124 at the back of the die 120 against which a threaded rod 126 can be urged. With the threaded rod 126 against the stop member 124, as the jaws 100 close the rod 126 becomes aligned in the threaded capture region 128. In the illustrated embodiment, a plane for shearing an elongated workpiece or rod, such as threaded rod 126 (FIG. 7), is defined by face 134 of die 120 and face 136 of die 122 (FIG. 9). As the jaws 100 continue to be forced closed by the rollers moving forward along the cams 232, the threaded rod is sheared at a mating plane defined by faces 134, 136 of the dies 120, 122, respectively and as depicted in FIG. 9.

Figure 10:
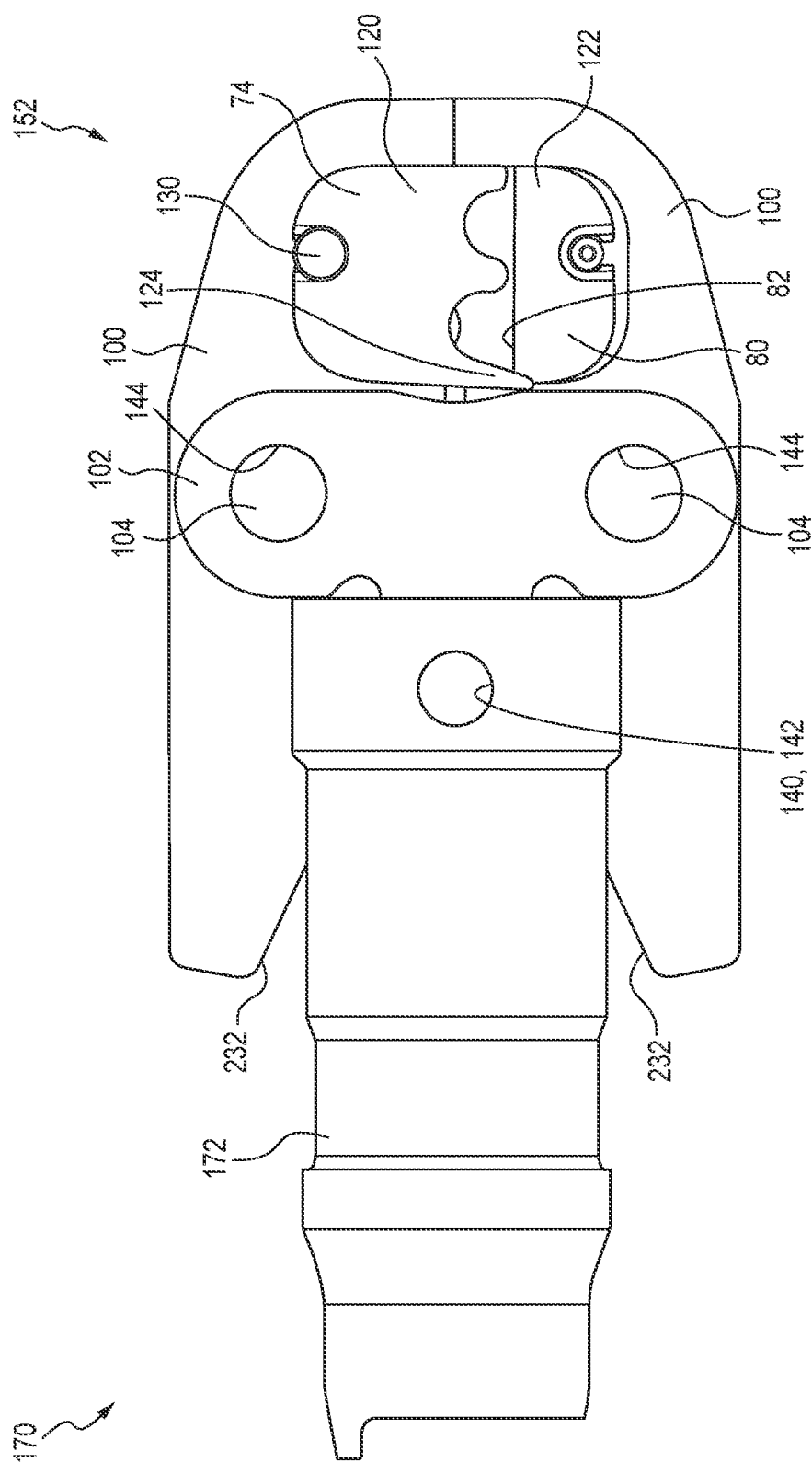
FIG. 10 is a schematic side elevational view of the shearing tool head, power tool, and dies of FIG. 8 upon positioning the tool head to a closed position.
Figure 10A:
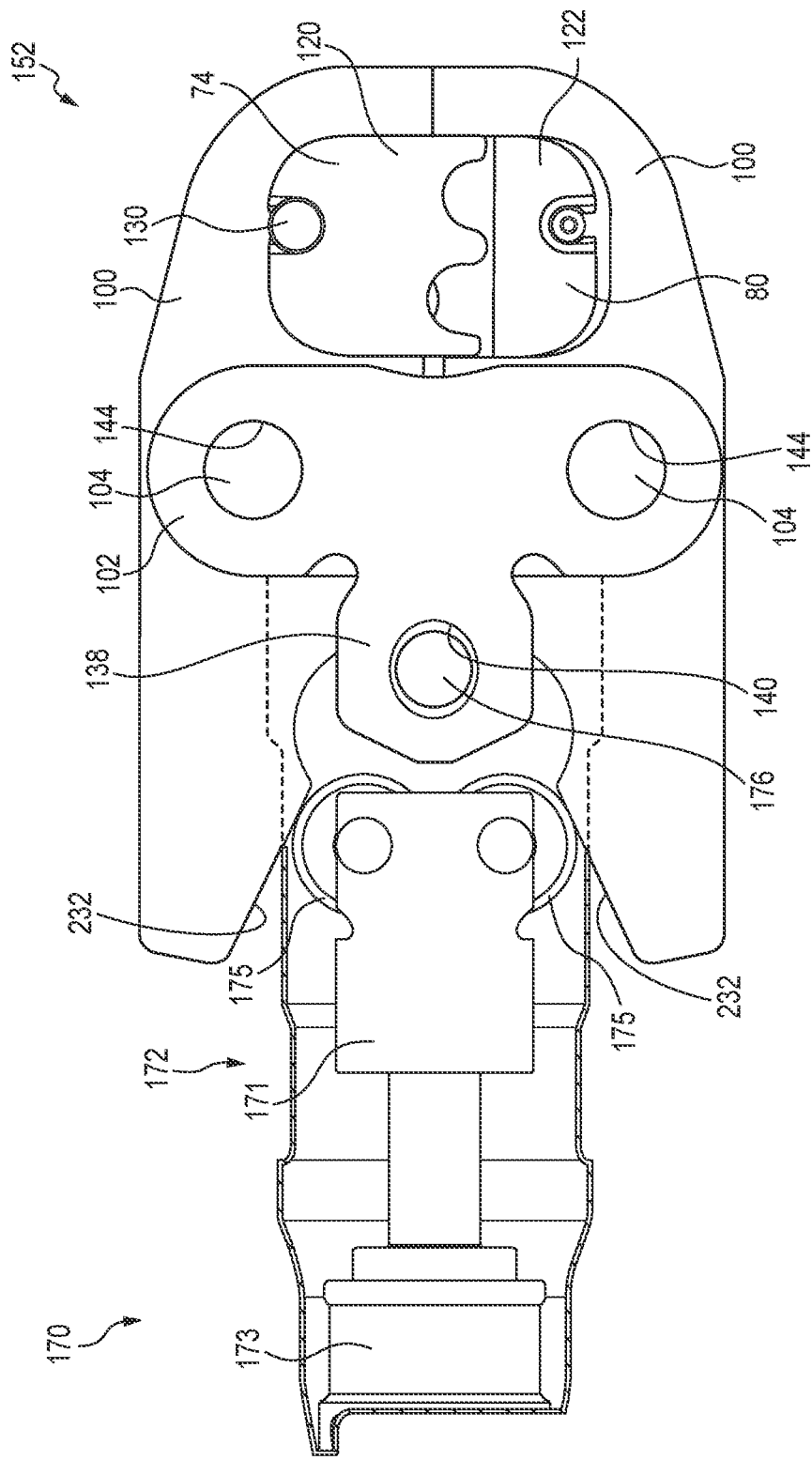
FIG. 10A is a schematic partial cross-sectional view of the shearing tool head, power tool and dies of FIG. 10.

FIGS. 8A and 10A are schematic partial cross-sectional views of the tool head 152, the power tool 170, and dies 120, 122 illustrated in FIGS. 8 and 10, respectively. FIGS. 8A and 10A illustrate a roller carriage 171 including a pair of rollers 175. Upon activation of the power tool 170 and extension of a hydraulic ram or similar powered displacement member shown as 173, the roller carriage 171 is urged toward the tool head 152, whereby contact occurs between the rollers 175 and the cam surfaces 232 of the jaws 100.

Figure 18:
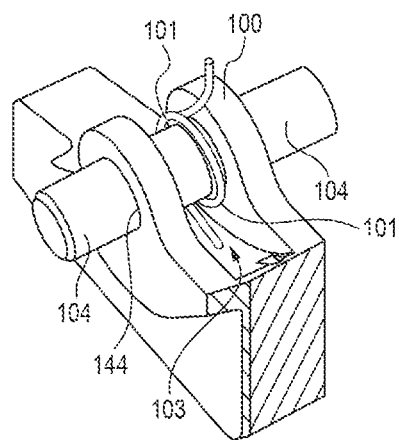
FIG. 18 is a schematic partial perspective view illustrating a portion of a jaw and a biasing member.

FIG. 18 is a schematic partial perspective view illustrating a portion of a representative jaw 100 such as jaw 100 depicted in the referenced figures such as FIG. 5, pivotally engaged with the pin 104 extending through aperture(s) 144 in the jaw. The jaw 100 can be biased open or closed by a torsion spring 101 positioned about the pin 104. The jaw 100 may include a recessed groove 103 or other region(s) for housing or accommodating the torsion spring 101. It will be understood that the jaws and/or tool heads of the present subject matter are not limited to the particular assembly shown in FIG. 18, and include a wide array of other configurations.

Tool Systems

The present subject matter also provides various tool systems utilizing the shear tools or tool heads. In many embodiments the tool systems comprise a power tool and the shear tool head which can be selectively engaged with the power tool. Nonlimiting examples of the power tool include press tools such as for example those described herein. And as described herein, the tool systems may be in the form of a power assembly with a non-detachable tool head. The tool systems can also include one or more sets of dies that are utilized in conjunction with the tool heads. In many versions, the die sets include multiple pairs of dies in which each pair of dies includes openings shaped and sized to receive a particular workpiece such as threaded rod having a certain diameter and/or size. In many versions, each pair of dies is interchangeable with other pair(s) in the die set. The present subject matter tool systems also optionally include interchangeable jaw sets. For example, a certain pair of jaws may include a particular cam profile to impart desired force(s) on a die. Using interchangeable jaw sets, another pair of jaws could be used having a different cam profile to thereby provide a different force profile to the tool head. Similarly, the present subject matter includes tool heads using interchangeable components and/or assemblies. And, as noted dies having outer engagement surfaces can be selectively profiled to exhibit a desired cam surface.

Methods

The present subject matter also provides methods of shearing a workpiece such as threaded rod using the tool heads. Generally, the methods comprise providing a tool system such as the systems described herein. The methods also comprise inserting or otherwise positioning a workpiece such as threaded rod in the dies used with the tool head. Typically, the workpiece is positioned in the tool head and between the dies. The methods also comprise actuating the power tool such that the jaws of the shear tool are pivotally displaced and cause movement of one die past the other die to thereby shear the workpiece in the dies.

The methods also include methods of severing a plurality of rods and particularly two rods. These methods specifically include severing the rods to equal lengths. In many applications at least one of the rods includes a threaded region and/or is entirely threaded. And, in many applications all of the rods to be severed are threaded rods.

In summary, the shear tools of the present subject matter address the problems noted with prior art devices as follows. The advantages of the present subject matter devices include (i) ability to shear multiple pieces at a single time or in a single actuation of the power tool, (ii) when cutting through multiple pieces, the cutting could be staggered so that the tool utilizes travel and keeps force(s) low rather than requiring high force/short travel, (iii) retaining the dies while allowing die changing without loose pieces, (iv) dies can be easily retained with the jaws and/or detached therefrom using a push button release or cam screw or similar assembly, (v) dies are non-symmetrical, and so a user can easily position a rod against a stop and the rod does not need to be manually aligned. The stop only needs to be on one of the two dies.

The power tool(s) described herein, such as the RP340 or RP318, are not dedicated to pressing applications. Thus, the shear tool heads as described herein are one of several products that can be purchased for a variety of applications. As a result, the user investment to acquire a rod shearing system is limited to the cost of the attachment.

Many other benefits will no doubt become apparent from future application and development of this technology.

All patents, applications, standards, and articles noted herein are hereby incorporated by reference in their entirety.

The present subject matter includes all operable combinations of features and aspects described herein. Thus, for example if one feature is described in association with an embodiment and another feature is described in association with another embodiment, it will be understood that the present subject matter includes embodiments having a combination of these features.

As described hereinabove, the present subject matter solves many problems associated with previous strategies, systems and/or devices. However, it will be appreciated that various changes in the details, materials and arrangements of components, which have been herein described and illustrated in order to explain the nature of the present subject matter, may be made by those skilled in the art without departing from the principle and scope of the claimed subject matter, as expressed in the appended claims.

What is claimed is:

1. A tool head and dies for severing a workpiece, the tool head and dies comprising:
a pair of pivotally attached jaws, the pair of jaws including a first jaw defining a first die recess, and a second jaw defining a second die recess;
a first die disposed in the first die recess, the first die having a front projection, a medial projection, and a rearwardly located stop member, the first die defining a first capture region between the front projection and the medial projection, and a second capture region between the medial projection and the stop member;
a second die disposed in the second die recess, the second die having a front projection, a medial projection, and a rear projection, the second die defining a first capture region between the front projection and the medial projection, and a second capture region between the medial projection and the rear projection;
wherein the stop member of the first die has a height greater than the height of at least one of the medial projection of the first die and the front projection of the first die; and
wherein the first die defines a bottom surface opposite the first and second capture regions, and the height of the stop member, the medial projection, and the front projection are measured from the bottom surface of the first die.

2. The tool head and dies of claim 1 wherein the stop member of the first die has a height greater than the height of both the medial projection of the first die and the front projection of the first die.

3. The tool head and dies of claim 1 wherein each of the first capture region and the second capture region of the first die defines an arcuate receiving face for contacting a rod to be severed.

4. The tool head and dies of claim 3 wherein each arcuate receiving face of the first die includes a threaded region.

5. The tool head and dies of claim 4 wherein each of the first capture region and the second capture region of the second die defines an arcuate receiving face for contacting a rod to be severed.

6. The tool head and dies of claim 5 wherein each arcuate receiving face of the second die includes a threaded region.

7. A tool system comprising:
a power assembly including a body, a handle, and a motor;
a tool head including a pair of pivotally attached jaws, the pair of jaws having a first jaw defining a first die recess, and a second jaw defining a second die recess; and
a first die disposed in the first die recess, the first die having a front projection, a medial projection, and a rearwardly located stop member, the first die defining a first capture region between the front projection and the medial projection, and a second capture region between the medial projection and the stop member;

a second die disposed in the second die recess, the second die having a front projection, a medial projection, and a rear projection, the second die defining a first capture region between the front projection and the medial projection, and a second capture region between the medial projection and the rear projection;

wherein the stop member of the first die has a height greater than the height of at least one of the medial projection of the first die and the front projection of the first die; and wherein the first die defines a bottom surface opposite the first and second capture regions, and the height of the stop member, the medial projection, and the front projection are measured from the bottom surface of the first die.

8. The tool system of claim 7 wherein each of the first capture region and the second capture region of the first die defines an arcuate receiving face for contacting a rod to be severed.

9. The tool system of claim 8 wherein each arcuate receiving face of the first die includes a threaded region.

10. The tool system of claim 7 wherein each of the first capture region and the second capture region of the second die defines an arcuate receiving face for contacting a rod to be severed.

11. The tool system of claim 10 wherein each arcuate receiving face of the second die includes a threaded region.

12. At least two dies adapted for use with a tool head having a pair of jaws, the at least two dies comprising:

a first die having a front projection, a medial projection, and a rearwardly located stop member, the first die defining a first capture region between the front projection and the medial projection, and a second capture region between the medial projection and the stop member;

a second die having a front projection, a medial projection, and a rear projection, the second die defining a first capture region between the front projection and the medial projection, and a second capture region between the medial projection and the rear projection;

wherein the stop member of the first die has a height greater than the height of at least one of the medial projection of the first die and the front projection of the first die;

wherein the first die defines a bottom surface opposite the first and second capture regions, and the height of the stop member, the medial projection, and the front projection are measured from the bottom surface of the first die; and wherein the rear projection of the second die has a height less than the height of at least one of the medial projection of the second die and the front projection of the second die.

13. The dies of claim 12 wherein the stop member of the first die has a height greater than the height of both the medial projection of the first die and the front projection of the first die.

14. The dies of claim 12 wherein the rear projection of the second die has a height less than the height of both of the medial projection of the second die and the front projection of the second die.

15. The dies of claim 12 wherein each of the first capture region and the second capture region of the first die are semi-circular.

16. The dies of claim 12 wherein a distance relative to a die back-plane of the first capture region of the first die is greater than a distance relative to the die back-plane of the second capture region of the first die.

17. The dies of claim 12 wherein each of the first capture region and the second capture region of the second die are semi-circular.

18. The dies of claim 12 wherein a distance relative to a die back-plane of the first capture region of the second die is greater than a distance relative to a die back-plane of the second capture region of the second die.

19. The dies of claim 12 wherein each of the first capture region and the second capture region of the first die defines an arcuate receiving face for contacting a rod to be severed, and wherein each arcuate receiving face of the first die includes a threaded region.

20. The dies of claim 12 wherein each of the first capture region and the second capture region of the second die defines an arcuate receiving face for contacting a rod to be severed, and wherein each arcuate receiving face of the second die includes a threaded region.

* * * * *